(12) United States Patent
Conrad, Jr. et al.

(10) Patent No.: US 6,690,934 B1
(45) Date of Patent: **\*Feb. 10, 2004**

(54) MULTIPLE ACCESS SATELLITE COMMUNICATIONS NETWORK

(75) Inventors: Charles Conrad, Jr., Huntington Beach, CA (US); Thomas Ray Ingersoll, San Juan Capistrano, CA (US); Carl Joseph Glim, Huntington Beach, CA (US); David Earl Massey, Harleysville, PA (US)

(73) Assignee: Universal Space Network, Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/529,987
(22) PCT Filed: Oct. 23, 1998
(86) PCT No.: PCT/US98/22382
§ 371 (c)(1), (2), (4) Date: Jun. 5, 2000
(87) PCT Pub. No.: WO99/22529
PCT Pub. Date: May 6, 1999

Related U.S. Application Data

(63) Continuation-in-part of application No. 08/957,643, filed on Oct. 24, 1997, now Pat. No. 5,940,739.

(51) Int. Cl.[7] .............................................. H04B 7/185
(52) U.S. Cl. ..................... 455/427; 455/12.1; 455/13.1; 455/430; 342/357.08; 342/357.15
(58) Field of Search ............................... 455/12.1, 13.1, 455/427, 428, 430, 426, 302; 370/340, 316, 321, 250; 709/222; 342/357.15, 357.09, 357.08

(56) References Cited

U.S. PATENT DOCUMENTS

| | | | | |
|---|---|---|---|---|
| 5,446,465 A | * | 8/1995 | Diefes et al. | 342/357.08 |
| 5,579,367 A | * | 11/1996 | Raymond et al. | 455/418 |
| 5,590,395 A | | 12/1996 | Diekelman | 455/13.1 |
| 5,634,190 A | * | 5/1997 | Wiedeman | 455/13.1 |
| 6,389,464 B1 | * | 5/2002 | Krishnamurthy et al. | 709/220 |
| 6,434,361 B1 | * | 8/2002 | Carrozza et al. | 455/13.2 |

* cited by examiner

Primary Examiner—Dwayne Bost
Assistant Examiner—Kamran Afshar
(74) Attorney, Agent, or Firm—Kenyon & Kenyon

(57) ABSTRACT

A shared single system of ground stations (120) for servicing any number of satellite owners, permits the owners to transfer command information to their satellite (110), and collect data streams that arm sent back from the satellite all via a standardized global communication system maintained and operated by a commercial satellite communications company. A remotely controlled ground station (120) is operated and controlled from a central controller. Each user creates and stores a ground station configuration file at the central controller, which file contains the data necessary to configure the remotely controlled ground station (120) to communicate with the user's satellite (110). When the user desires to communicate with the user's satellite, the user schedules a communication session with the central controller, which downloads the configuration file to the appropriate ground station. The appropriate ground station is determined based on current orbital characteristics of the satellite in question. A server at the ground station then uses the data in the configuration file to configure equipment at the ground station to communicate with the desired satellite.

41 Claims, 39 Drawing Sheets

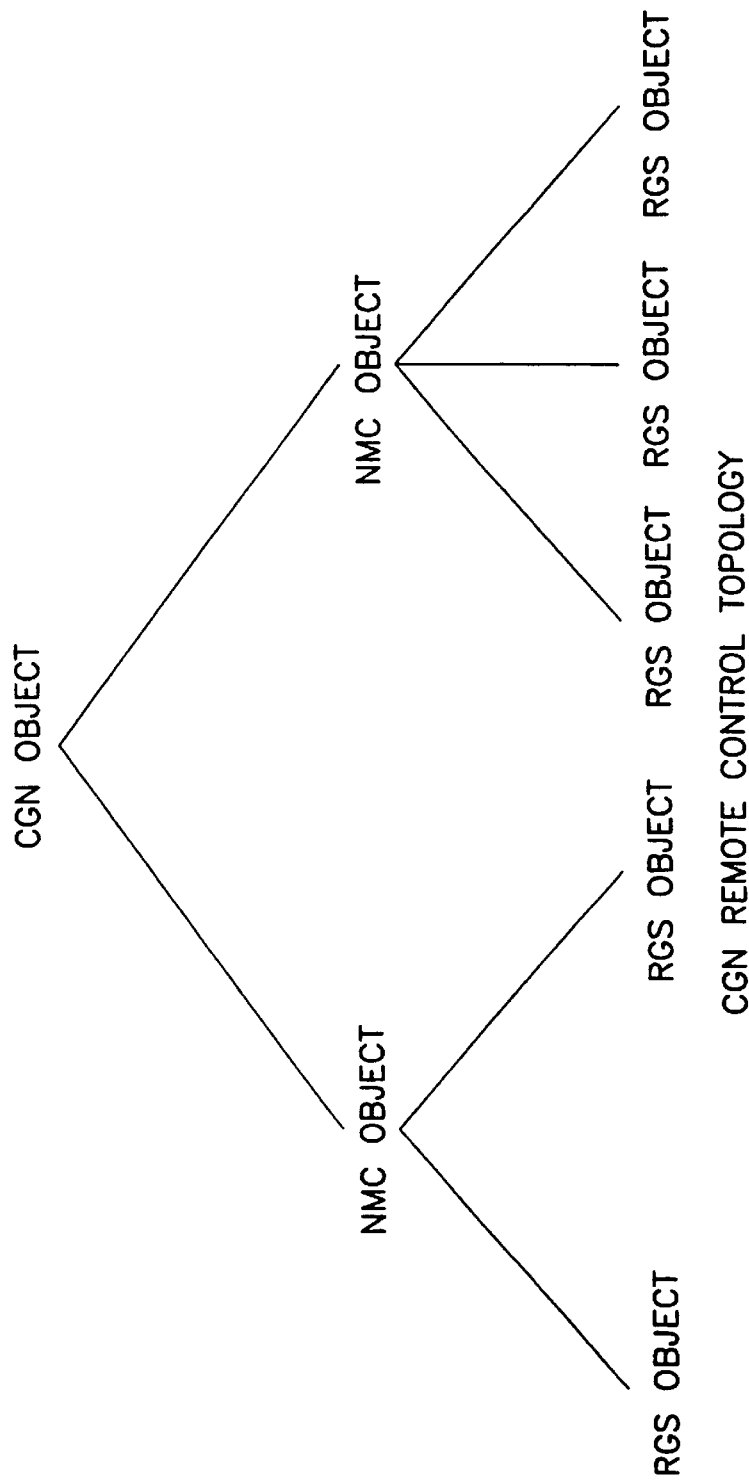

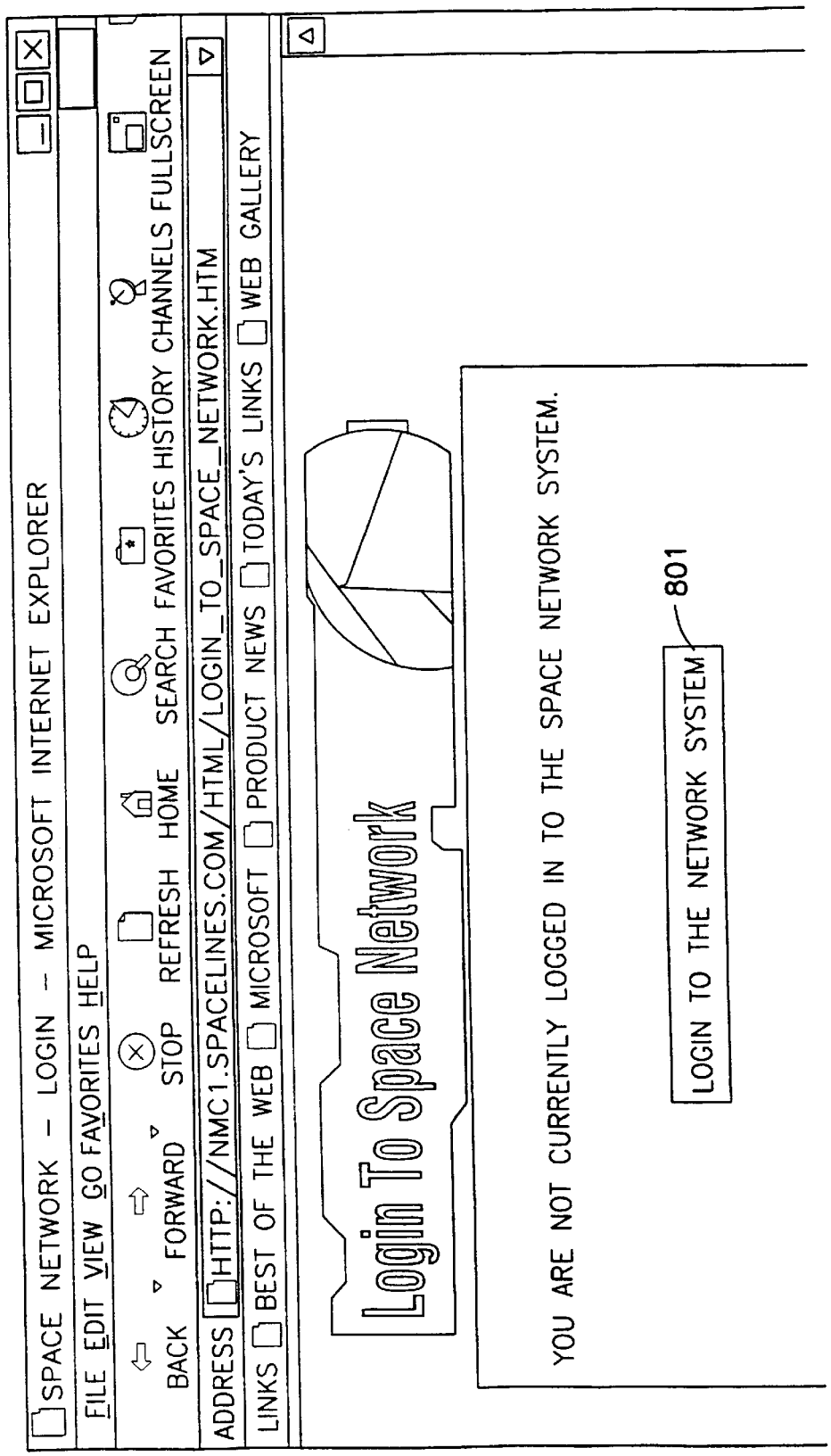
Fig. 8.1

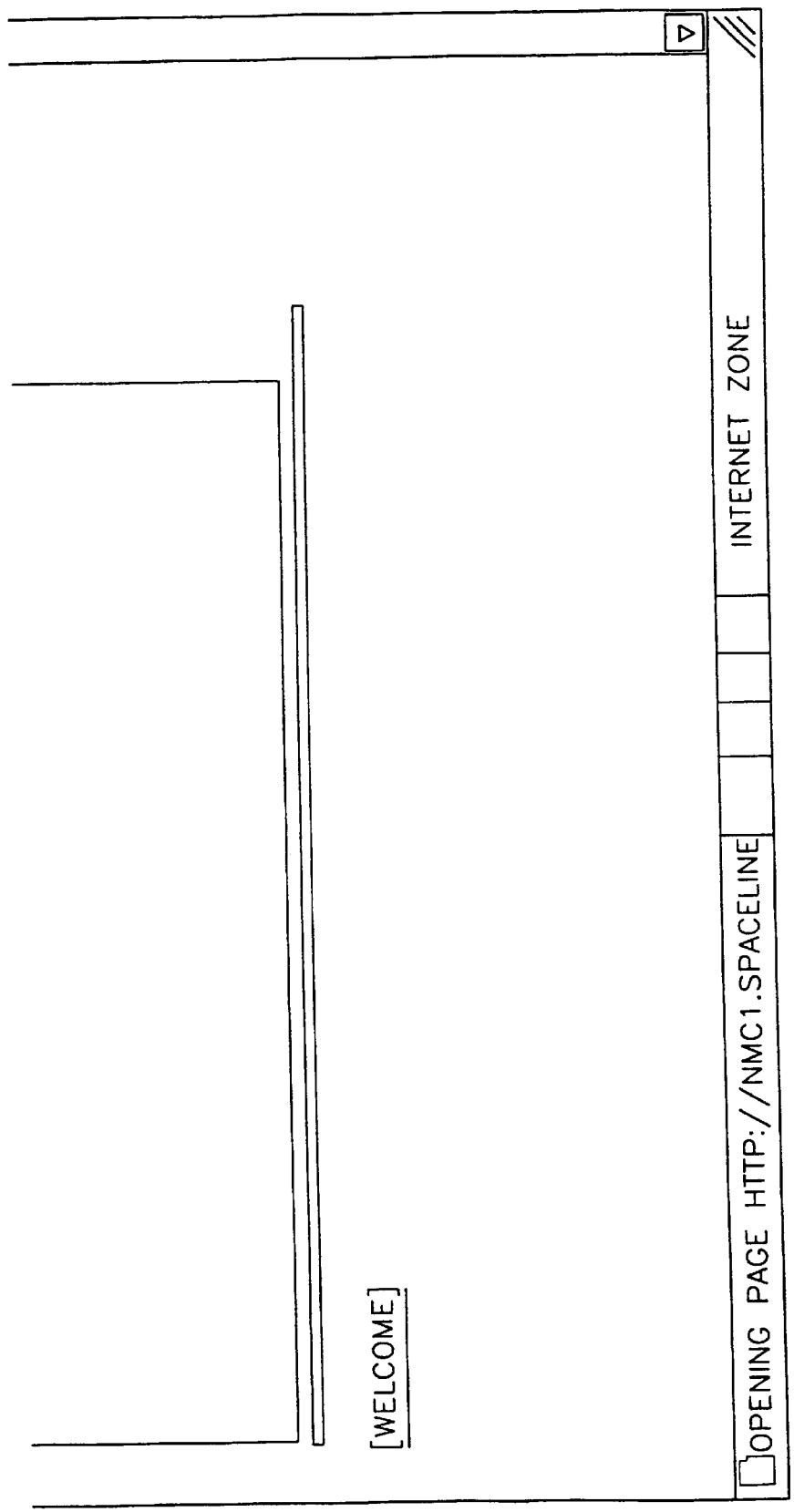

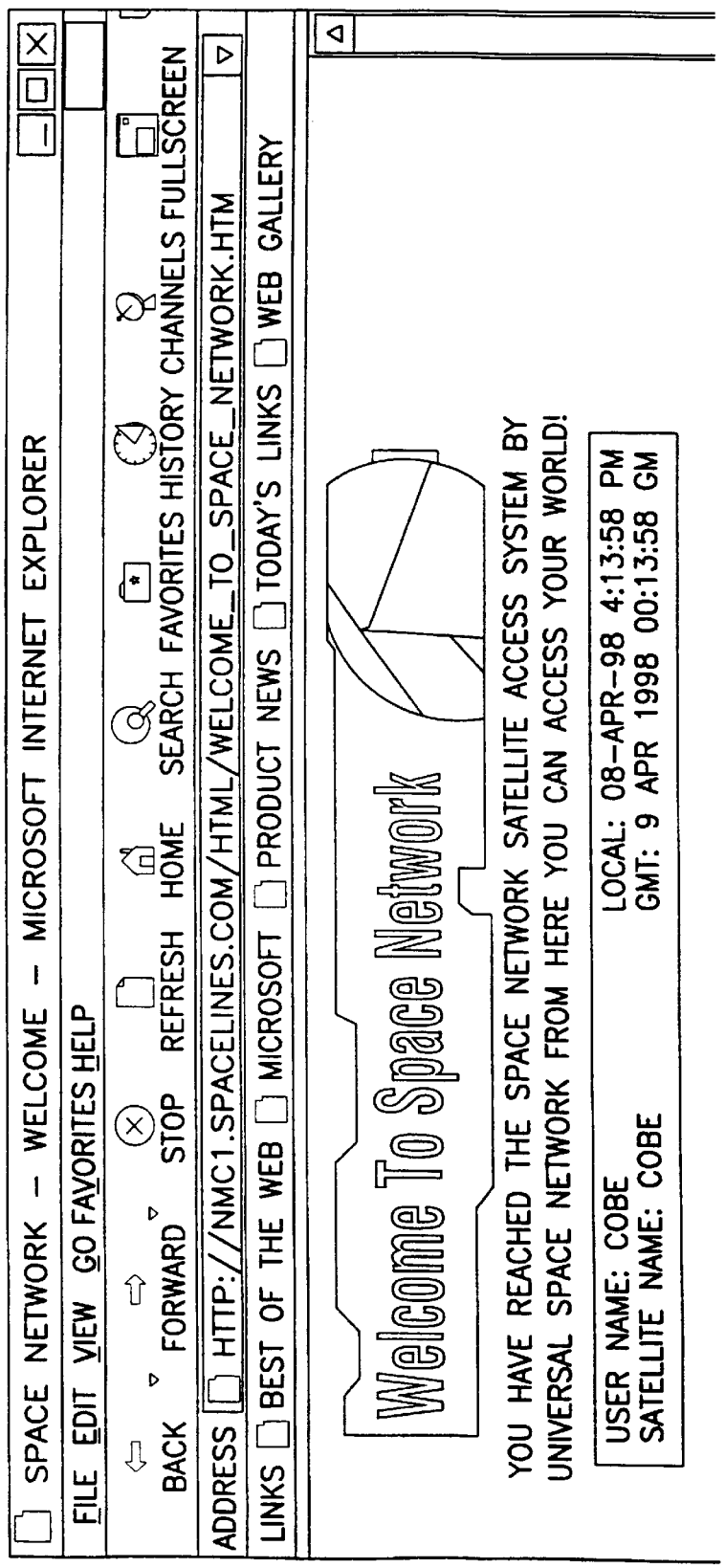
Fig. 10.1

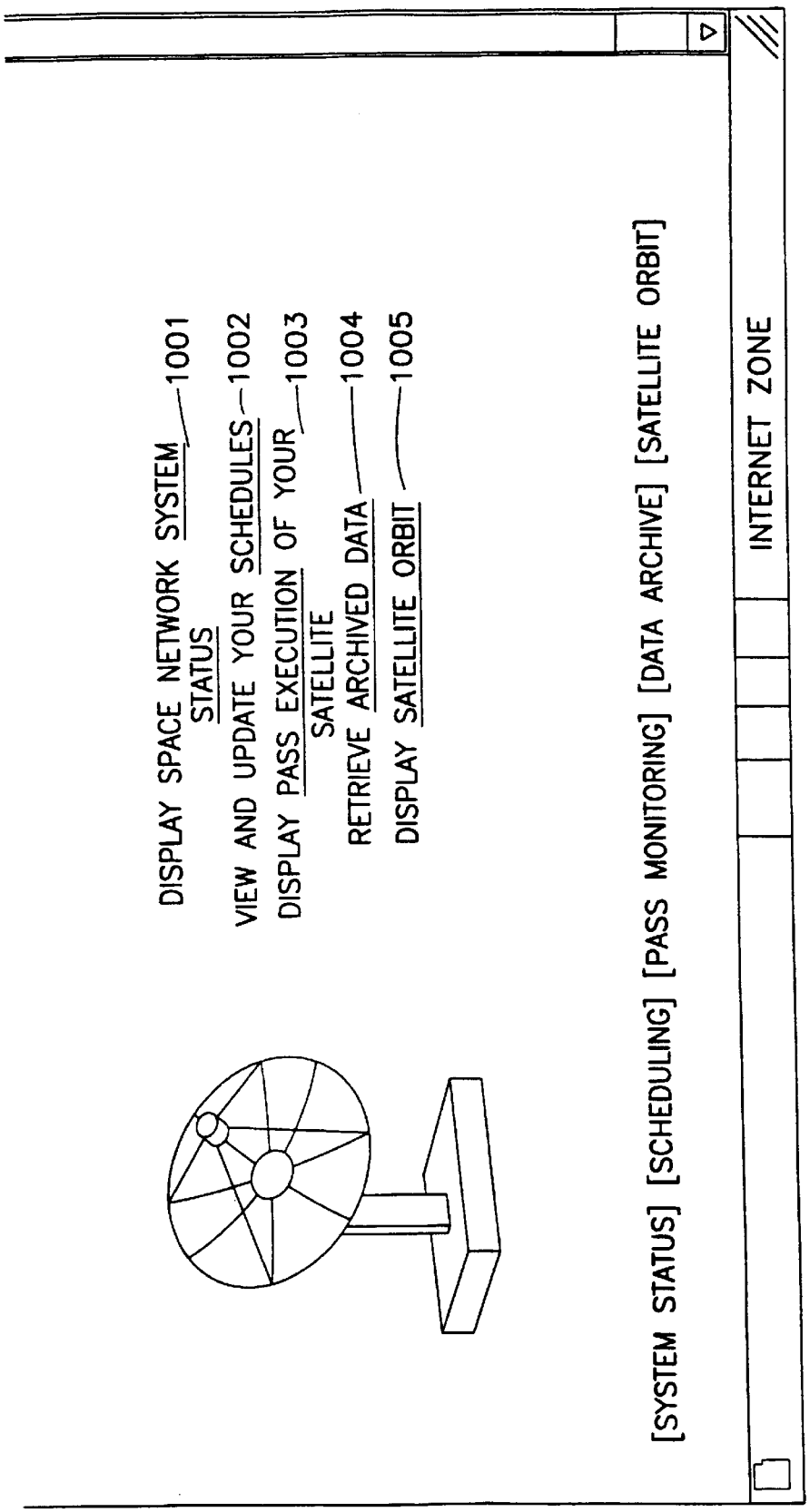
Fig. 10.2

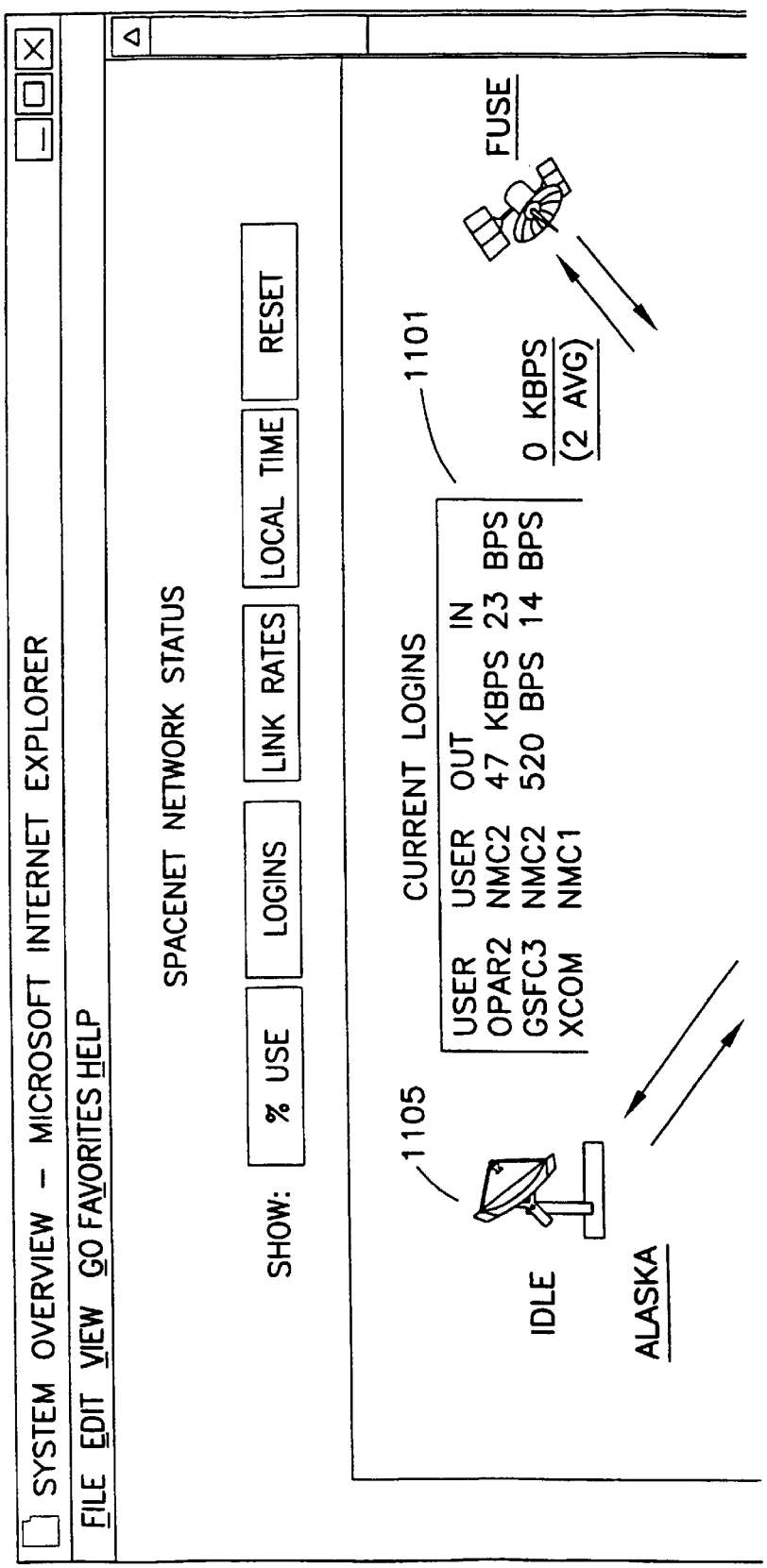
Fig. 11a.1

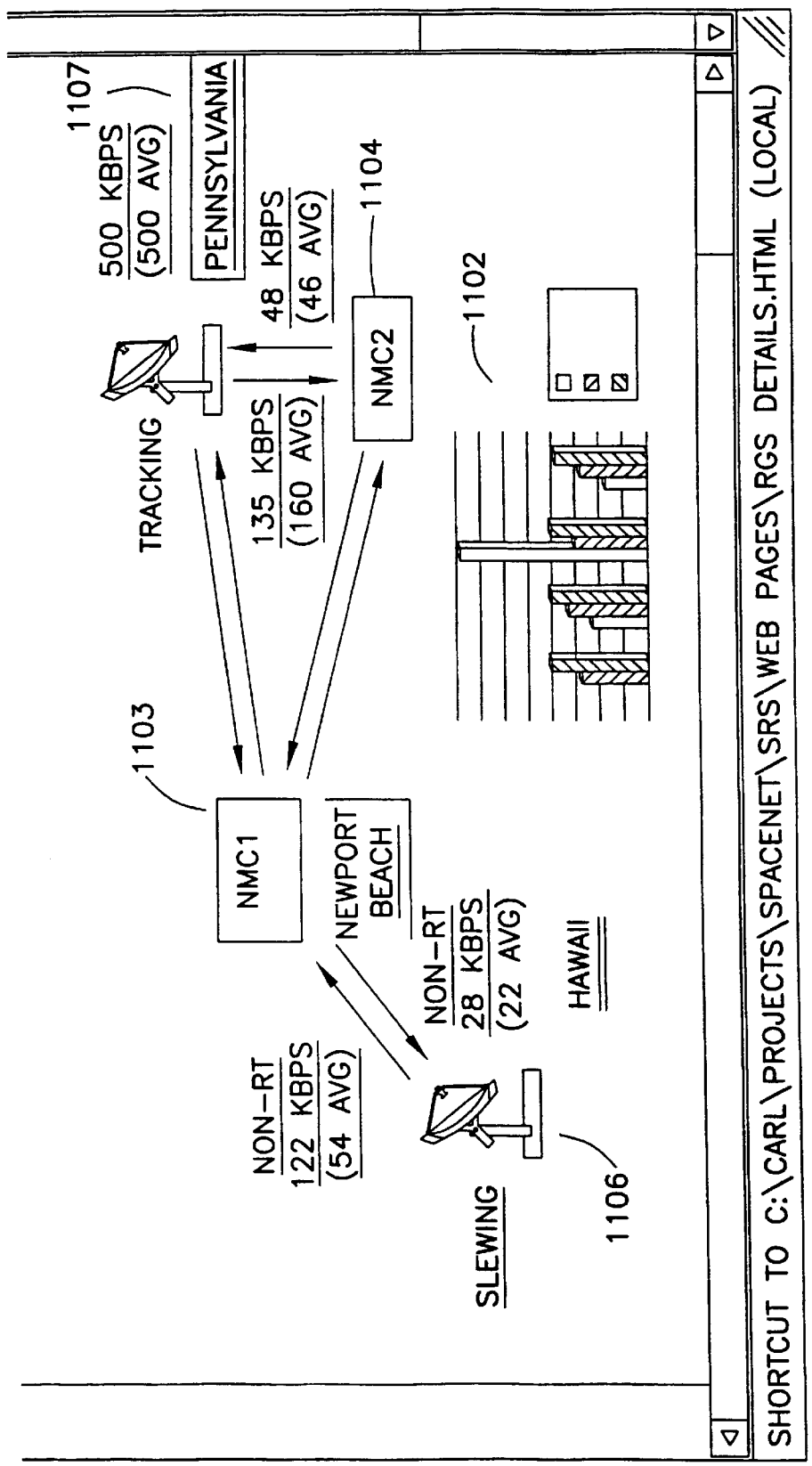
Fig. 11a.2

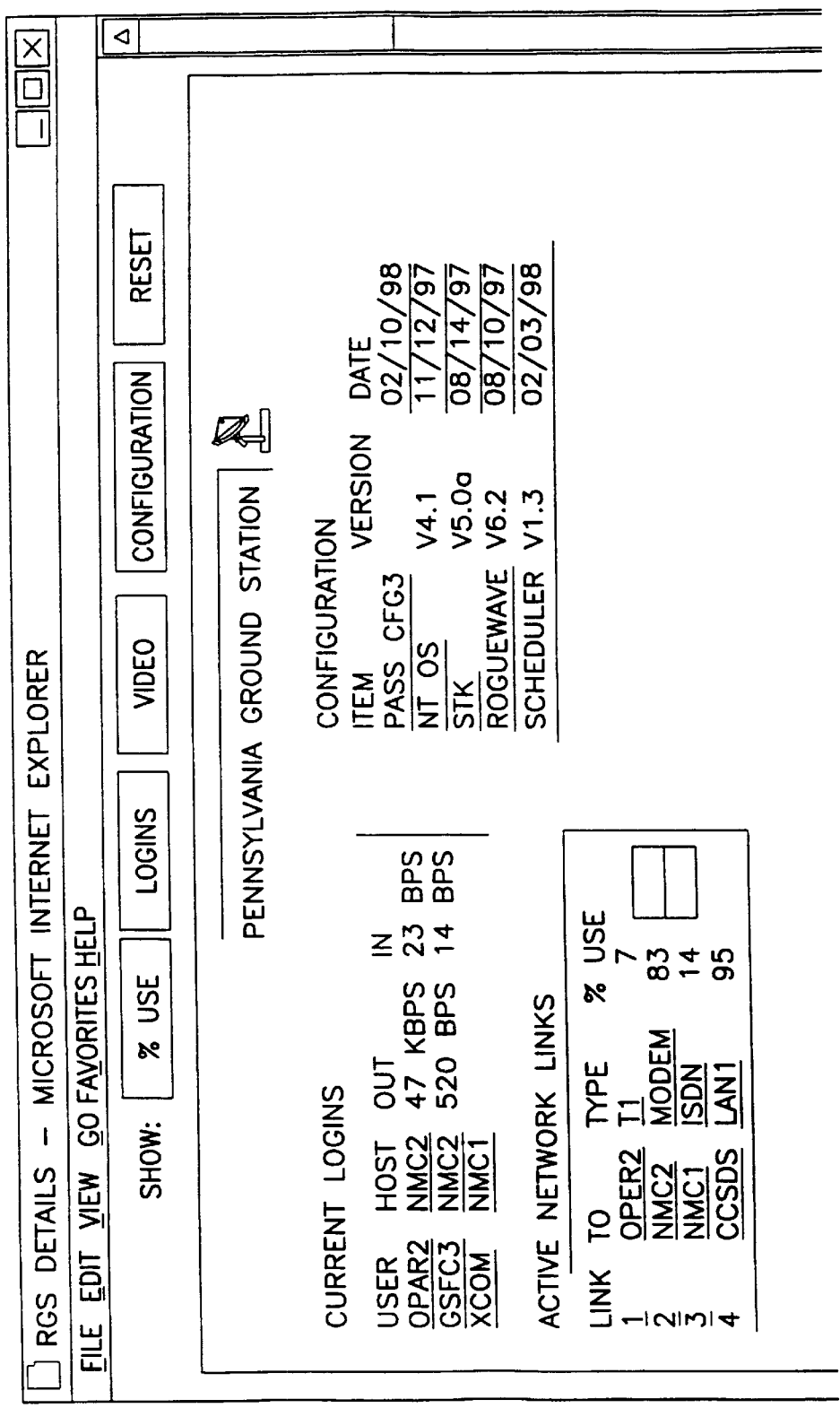
Fig. 11b.1

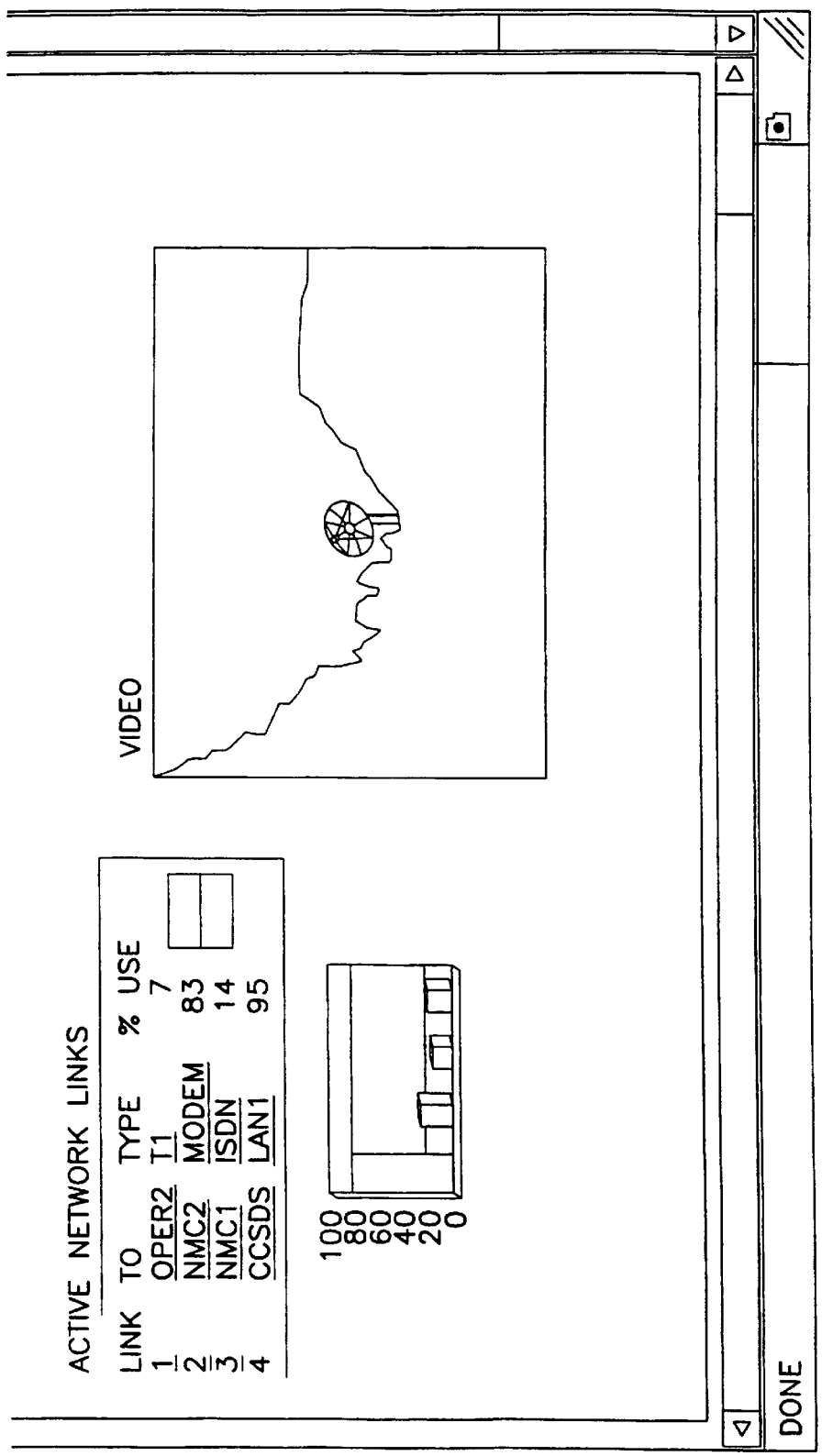
Fig. 11b.2

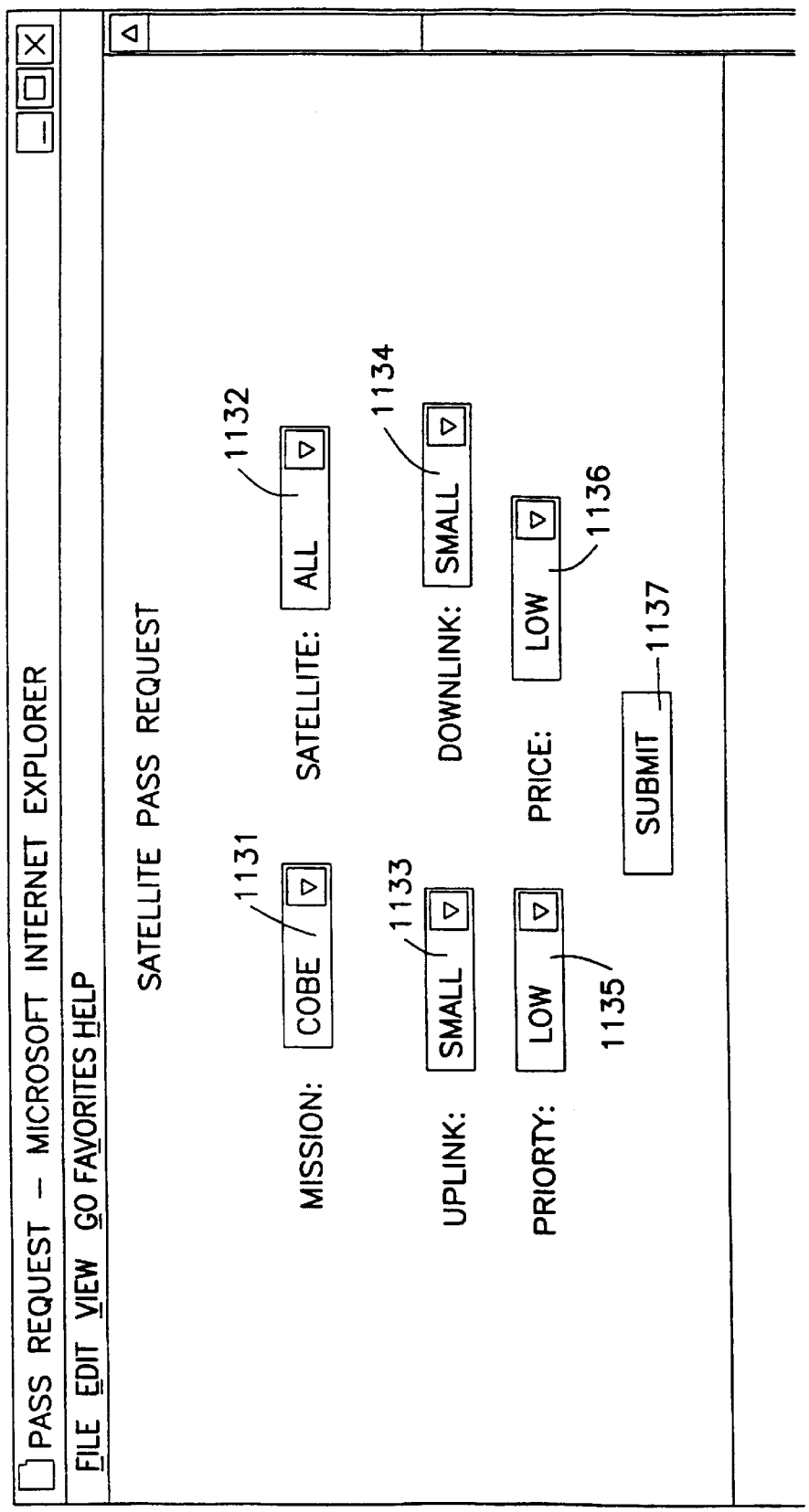
Fig. 11c.1

CURRENTLY AVAILABLE PASS SLOTS

LISTED IN ORDER OF [UTC ▷]

| PASS START (UTC*) | SATELLITE | GROUND STATION | PASS DURATION | GANTT |
|---|---|---|---|---|
| 51/07:18:49 | TDRS2 | HAWAII | 12:23 | XX |
| 52/21:11:27 | TDRS3 | ALASKA | 5:11 | |
| 52/22:45:08 | TDRS1 | HAWAII | 14:58 | XX |

DONE

PASS REQUEST WEB PAGE

Fig. 11c.2

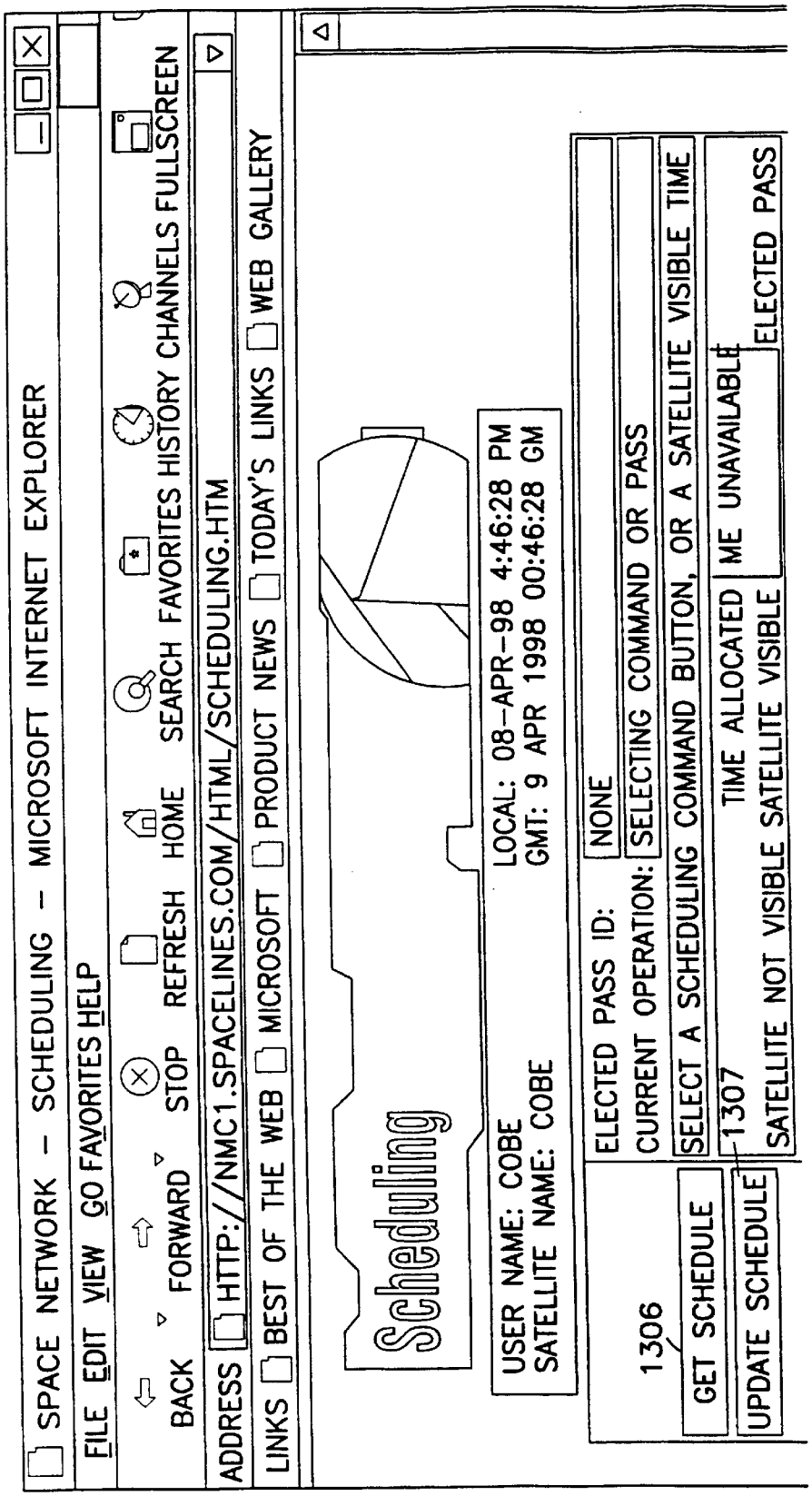
Fig. 13.1

SELECTED PASS – START TIME:    DURATION:

- 1301
- 1302
- 1303
- 1304
- 1305

PA3a
AK3a
H15a

08-APR-98   08-APR-98   08-APR-98   08-APR-98   09-APR-98

NEW PASS
MOVE PASS
DELETE PASS
UNDO
ZOOM IN
ZOOM OUT
CENTER POINT

[SYSTEM STATUS] [SCHEDULING] [PASS MONITORING] [DATA ARCHIVE] [SATELLITE ORBIT]   INTERNET ZONE

OPENING PAGE HTTP://NMC1.SPACELINE

Fig. 13.2

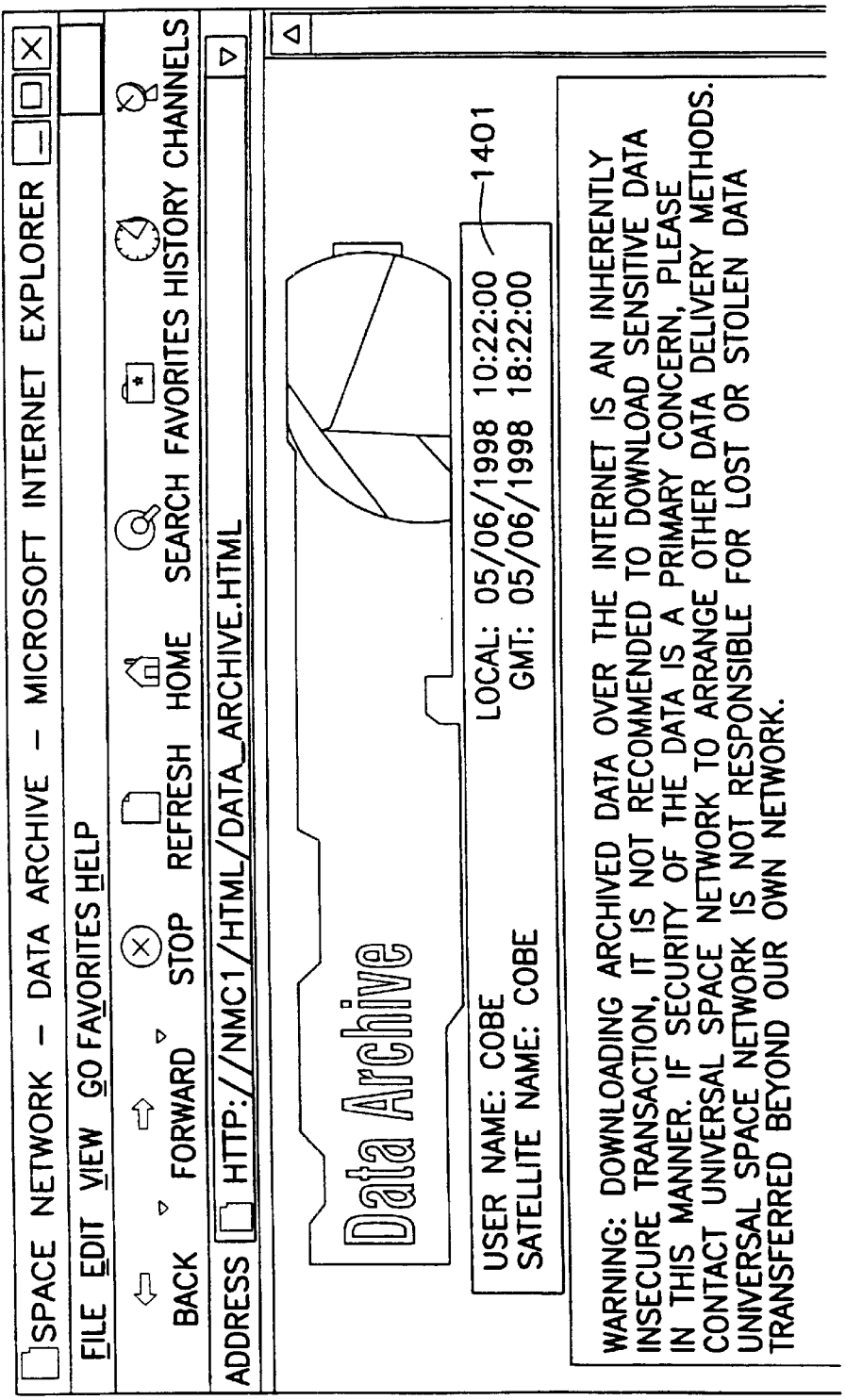
Fig. 14.1

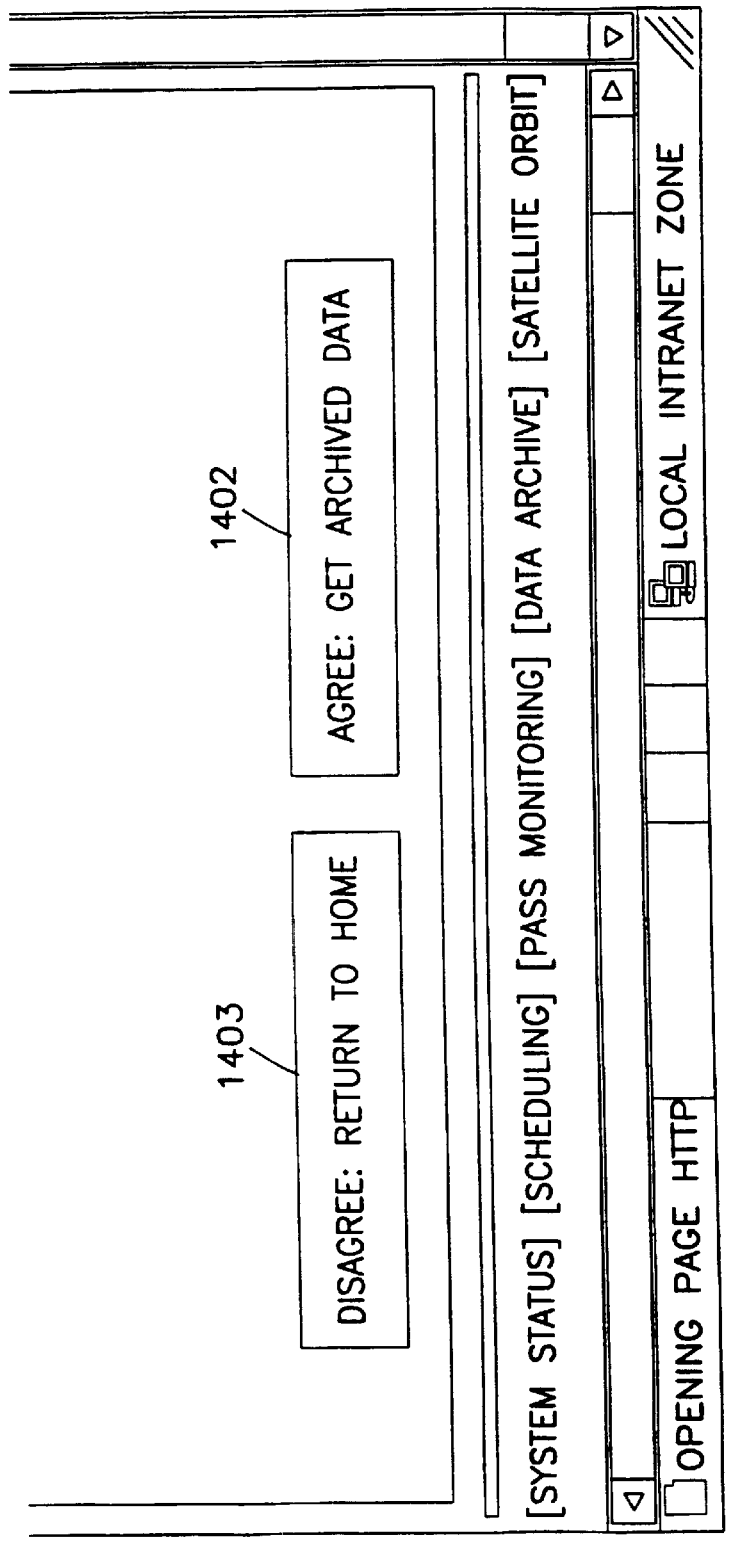
Fig. 14.2

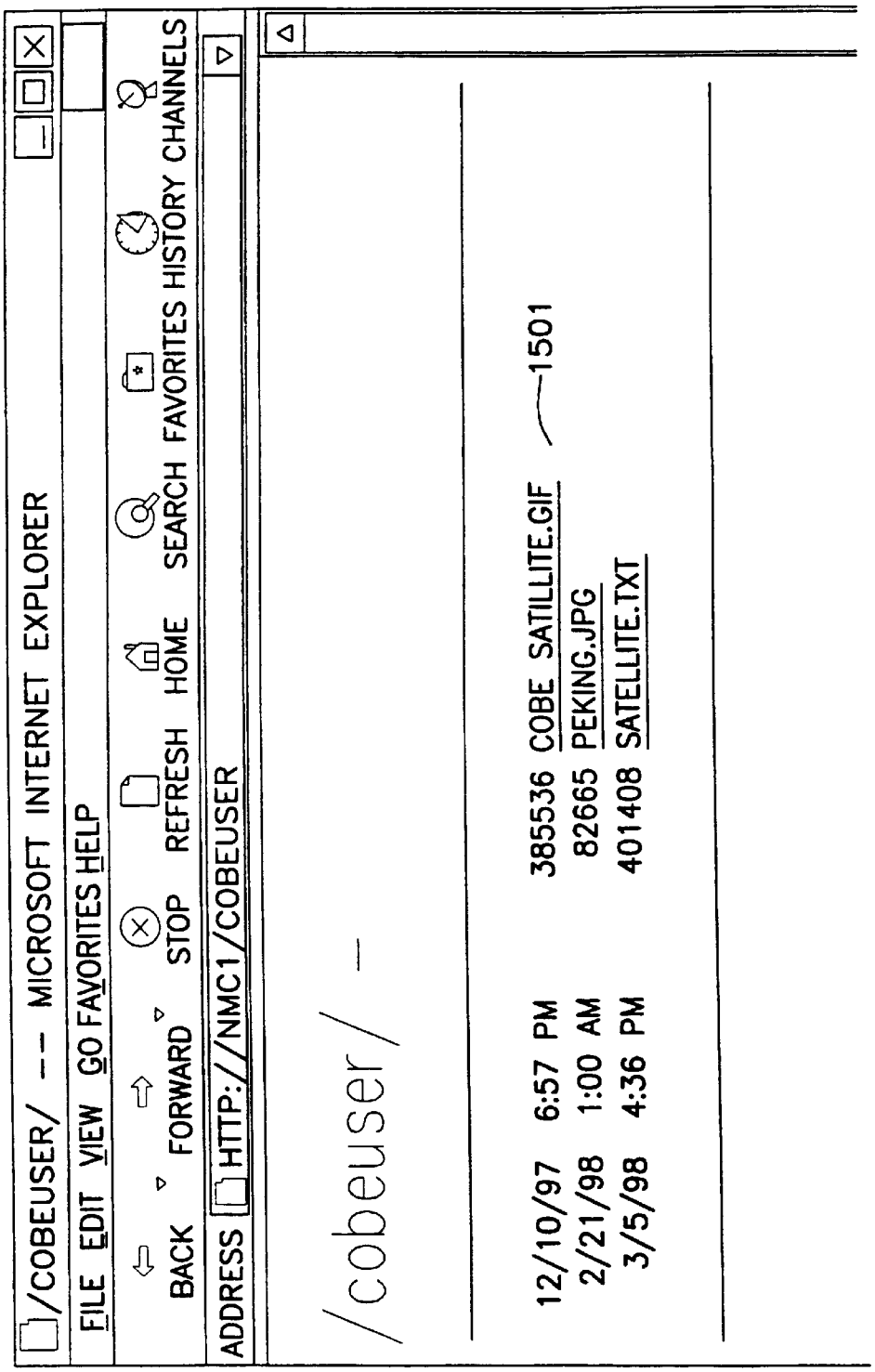
Fig. 15.1

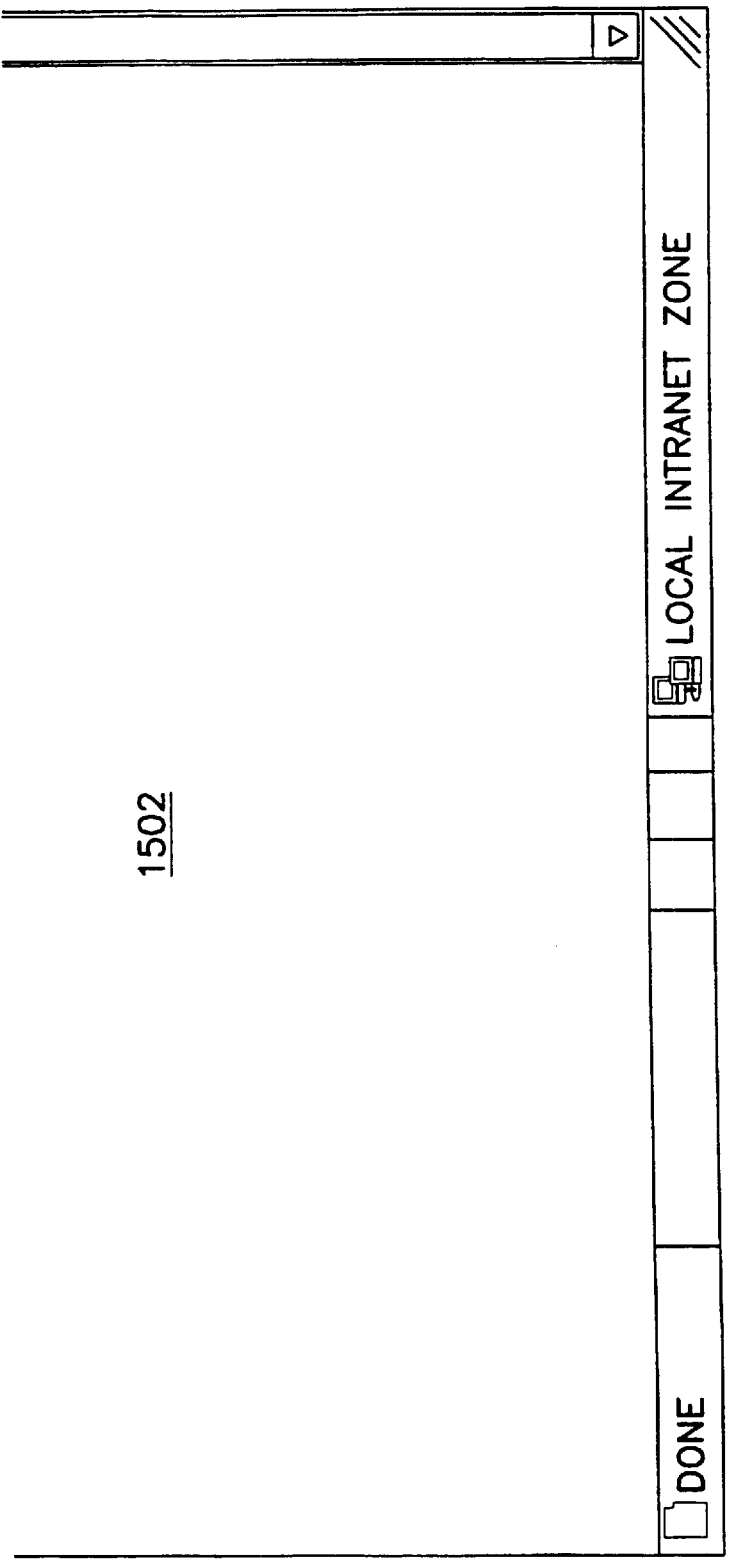
Fig. 15.2

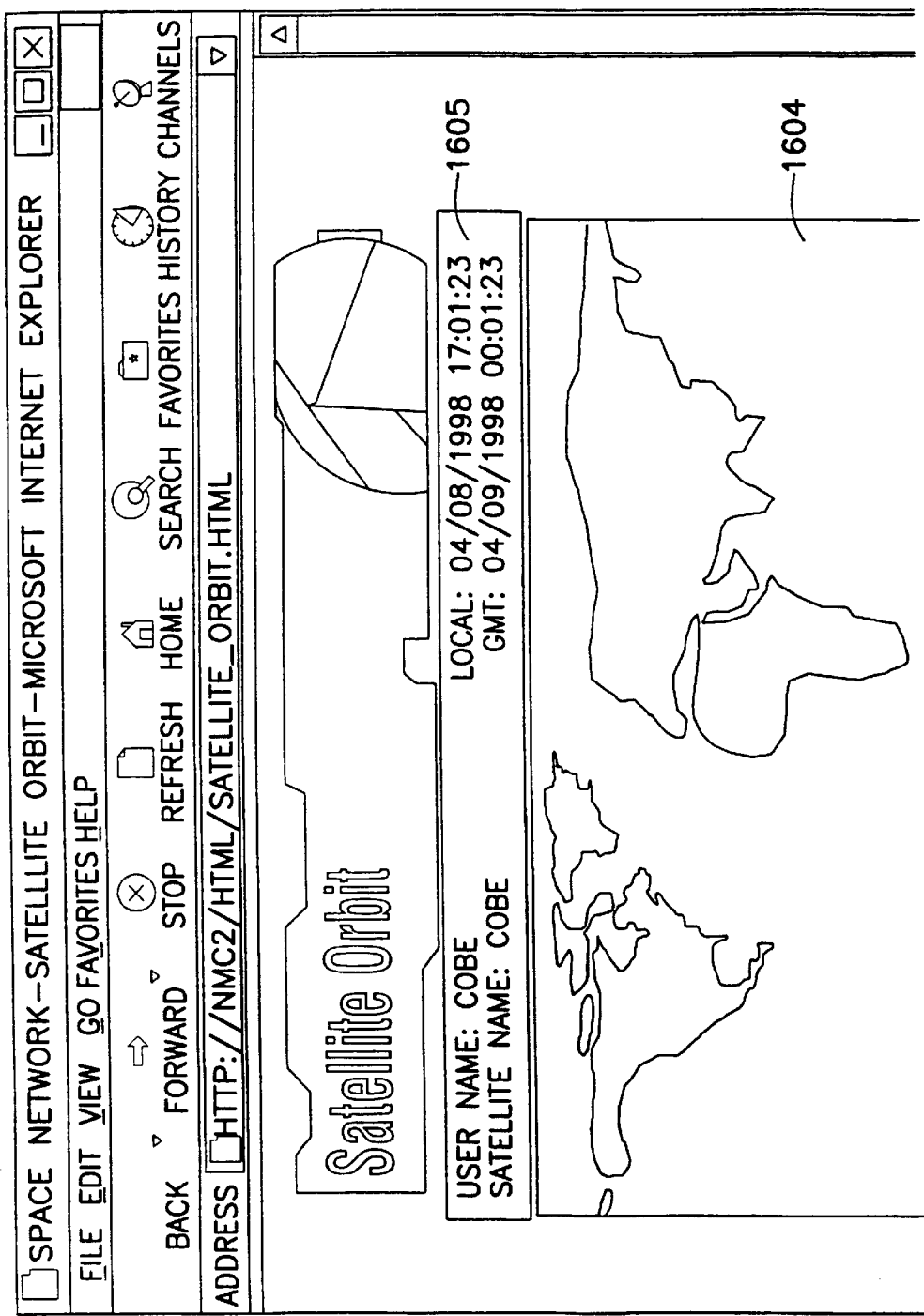
Fig. 16.1

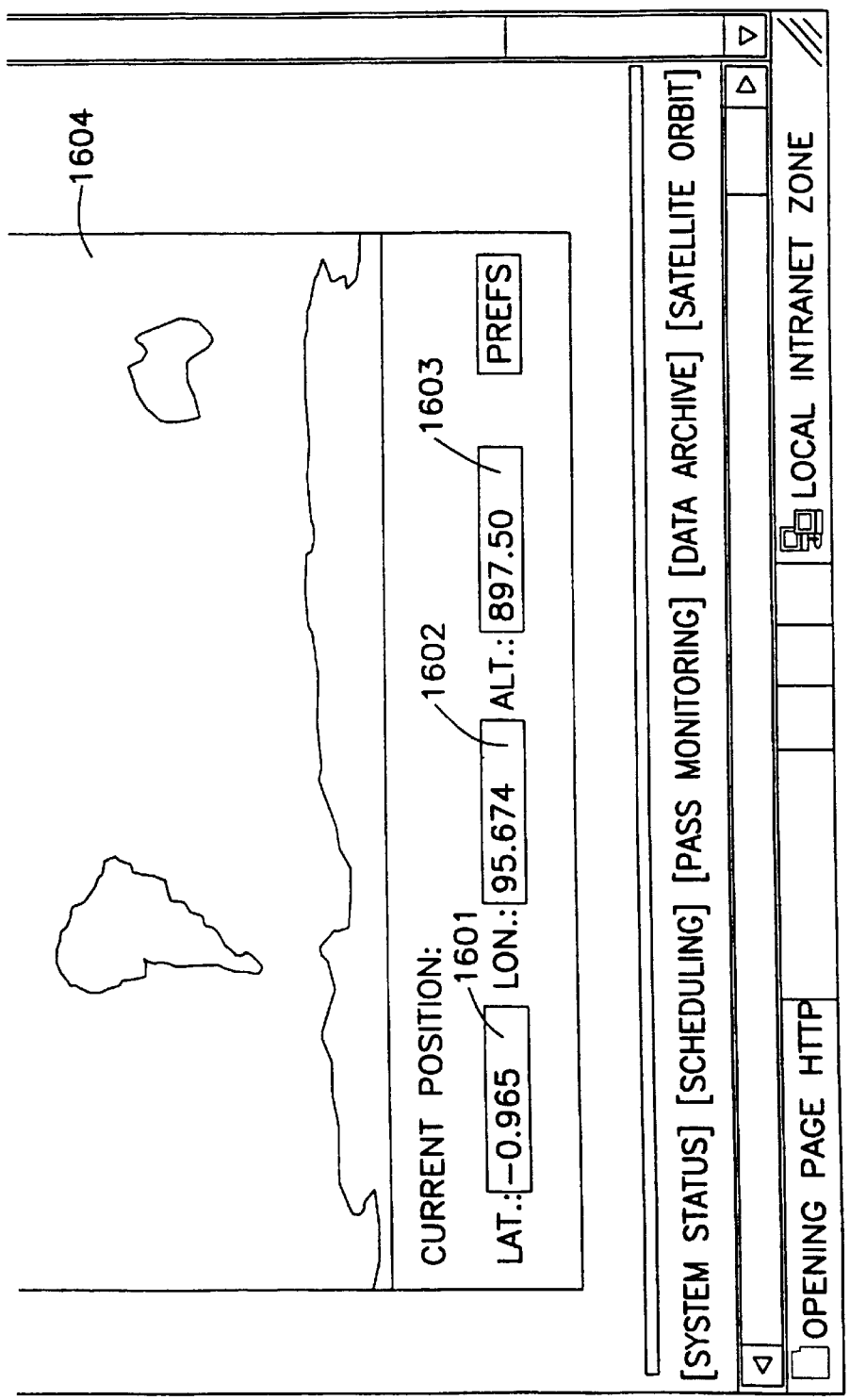
Fig. 16.2

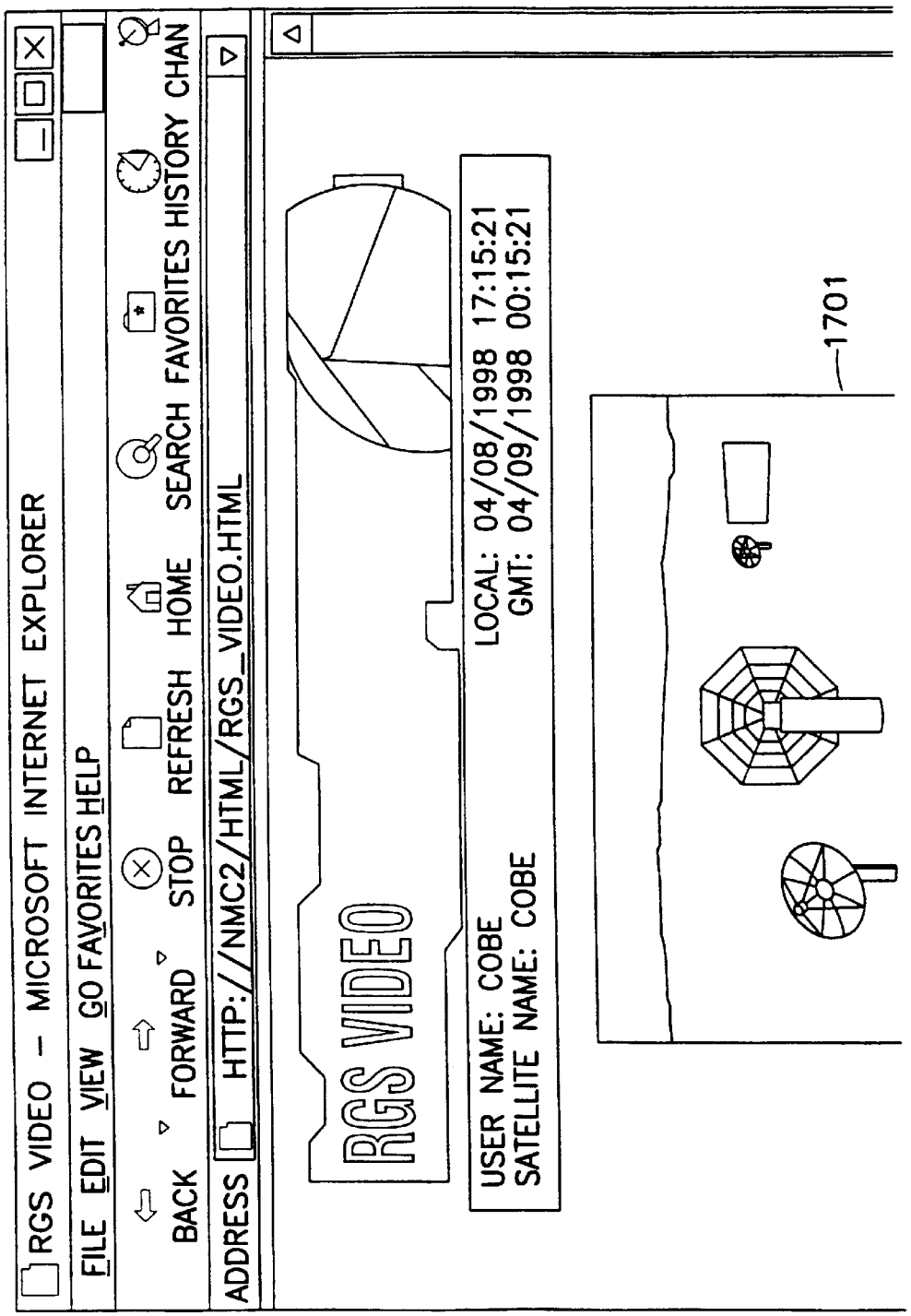
Fig. 17.1

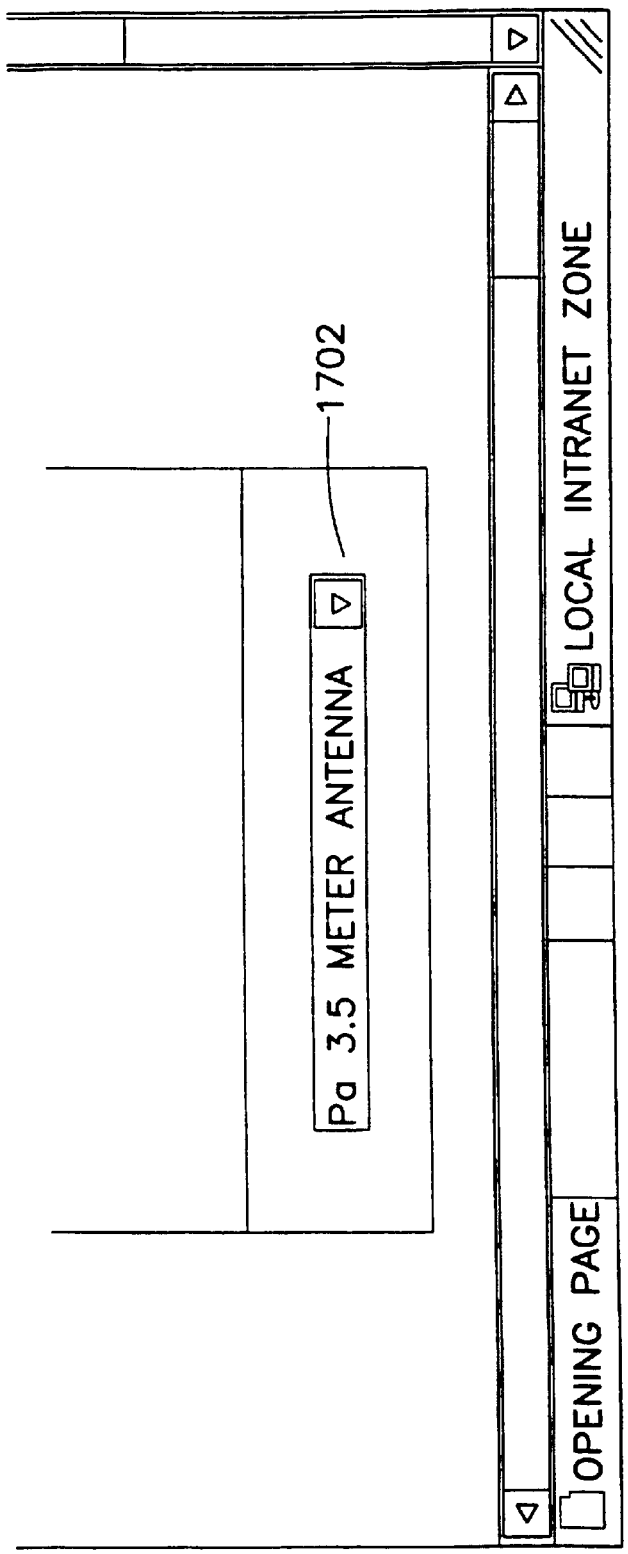
Fig. 17.2

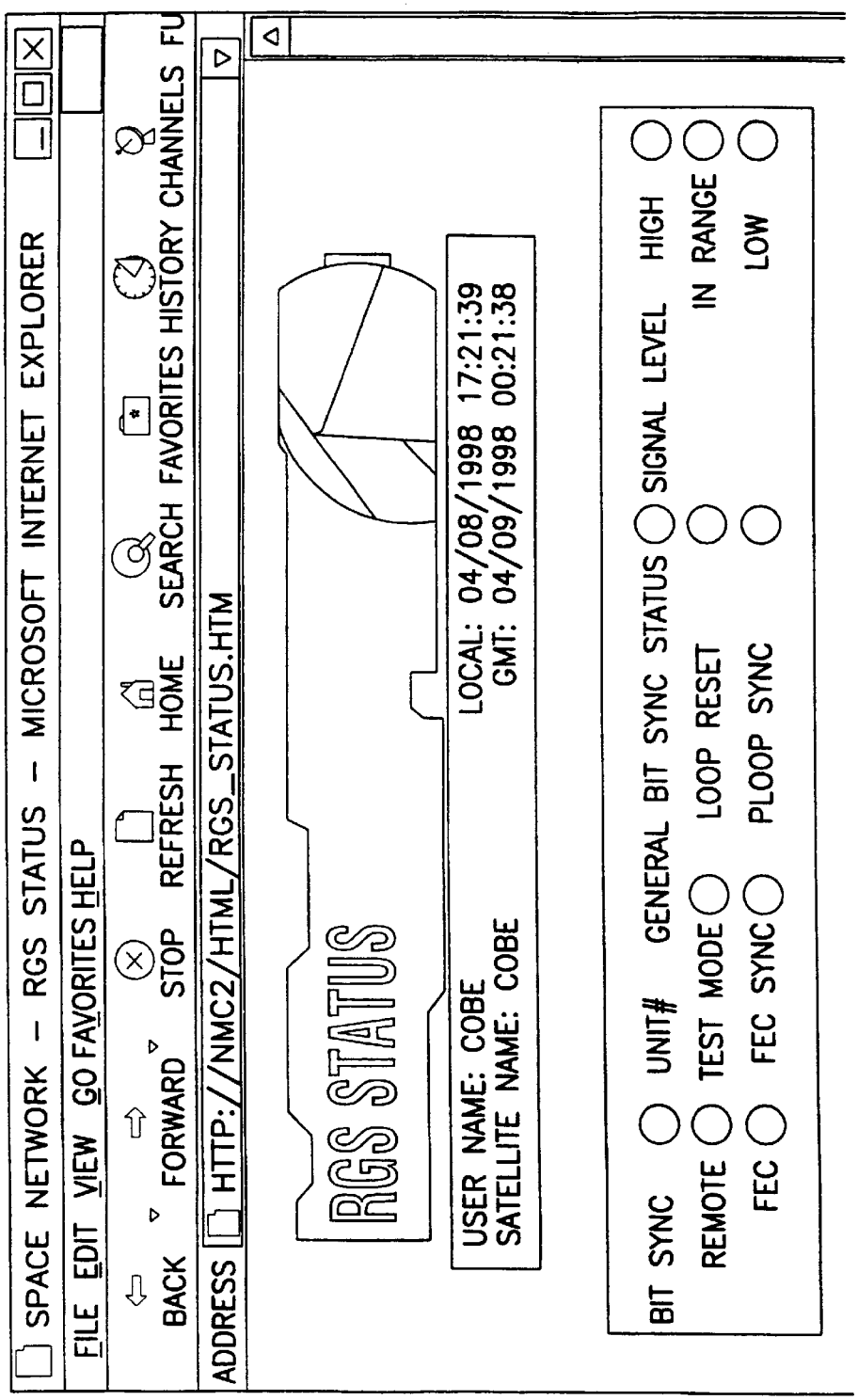
Fig. 18a.1

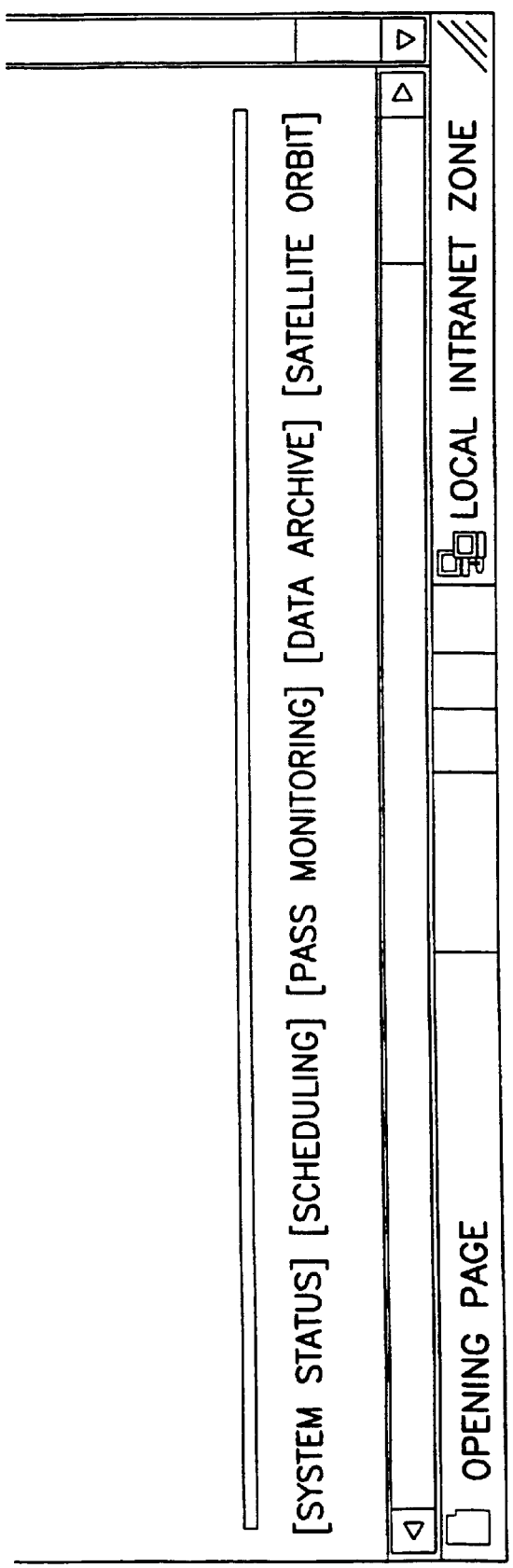
Fig. 18a.2

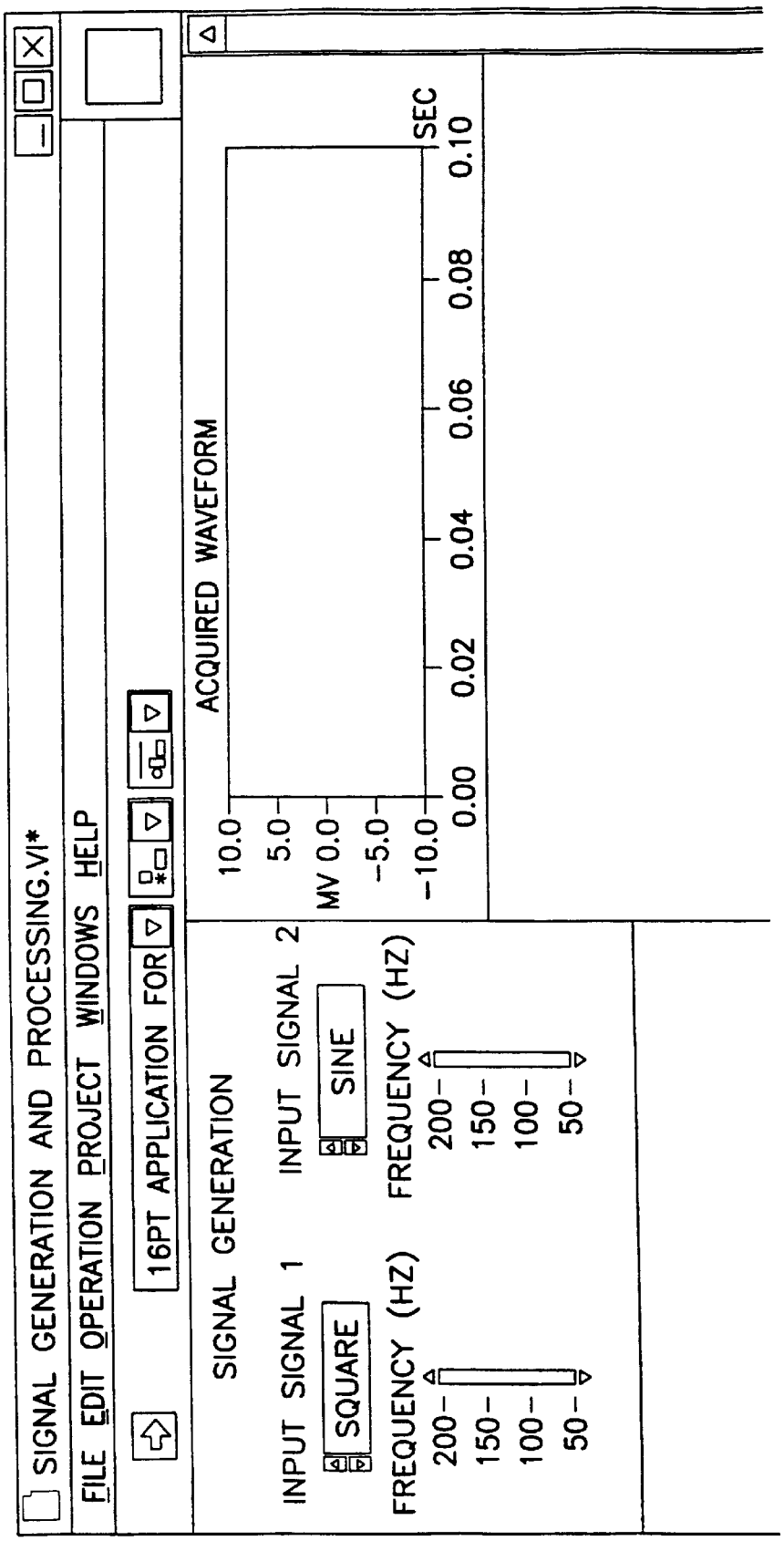
Fig. 18b.1

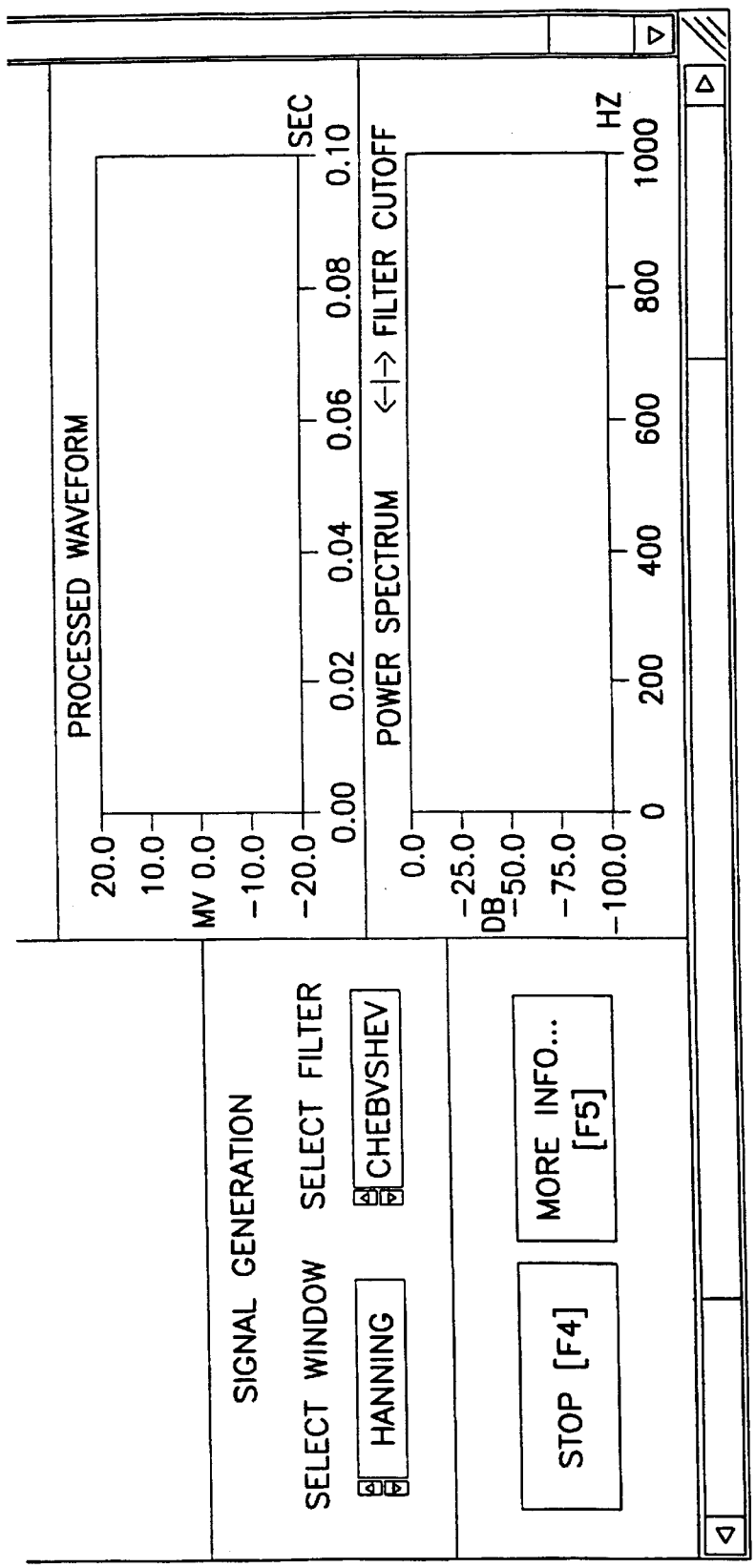
Fig. 18b.2

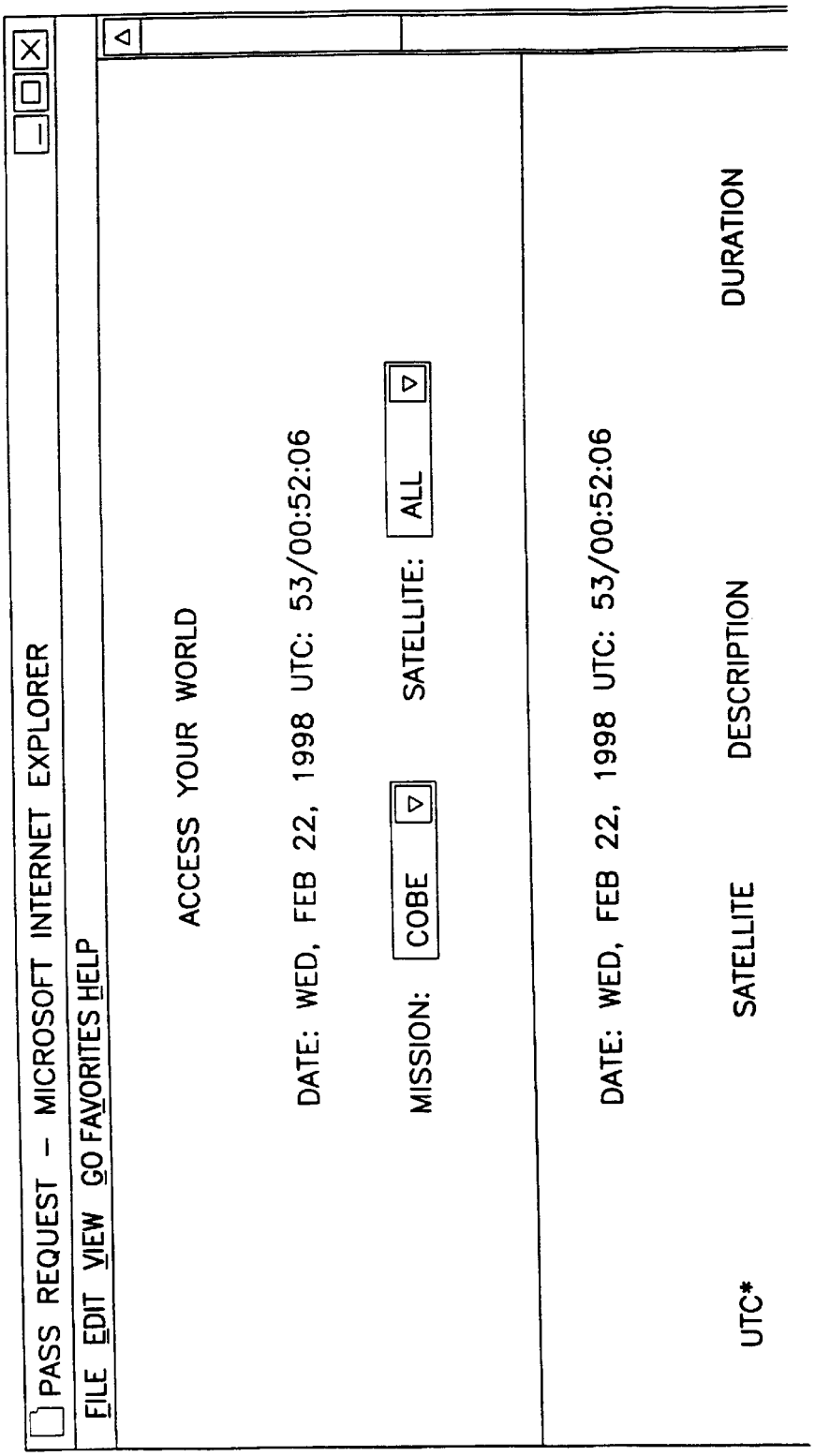
Fig. 19.1

| UTC* | SATELLITE | DESCRIPTION | DURATION |
|---|---|---|---|
| 51/07:18:49 | TDRS2 | DOWNLOAD IN PROGRESS | 00:37:31 |
| 52/21:11:27 | TDRS3 | CALIBRATION | 01:11:37 |
| 52/22:45:08 | TDRS1 | HEALTH CHECK, COMMAND LINK | 02:22:12 |

*NOTE: CLICK ON HEADING TO CHANGE UNITS

HOME | SATELLITE PASS REQUEST | EMAIL | CHARGES

Fig. 19.2

SCHEDULE WEB PAGE

| | |
|---|---|
| ORBIT TYPE? | CIRCULAR ☐ ELLIPTICAL ☐ SUN-SYNCHRONOUS ☐ |
| ASCENDING NODE LOCAL TIME CROSSING? | __:__ LOCAL TIME |
| ORBIT APOGEE? | ____ KM |
| ORBIT PERIGEE? | ____ KM |
| ORBIT PERIOD? | ____ MIN |
| NUMBER OF SUPPORT PASSES NEEDED/DAY? | ____ # |
| NUMBER OF MINUTES OF SUPPORT/DAY? | ____ MIN |
| GEOGRAPHIC STATIONS REQUESTED FOR SUPPORT | ALASKA ☐ |
| | HAWAII ☐ |
| | PENNSYLVANIA ☐ |
| | FLORIDA ☐ |
| | NORWAY ☐ |
| | DOESN'T MATTER ☐ |
| IS TELECOMMAND REQUIRED? | YES ☐ NO ☐ |
| IF YES THEN | |
| WHAT IS THE UNLINK RF FREQUENCY? | ____ MHZ |
| WHAT EIRP IS NEEDED? | ____ DBM |
| WHAT IS THE TELECOMMAND RATE? | ____ KBPS |

Fig. 20.1

| | |
|---|---|
| WHAT IS THE TELECOMMAND SUBCARRIER FREQUENCY? | ___ KHZ NONE ☐ |
| IS TELECOMMAND NASA STANDARD? | YES ☐ NO ☐ |
| DOES THE PROJECT REQUIRE SPECIAL EQUIPMENT AT RGS? | YES ☐ NO ☐ |
| | |
| DOES THE PROJECT REQUIRE REAL-TIME TELEMETRY DATA? | YES ☐ NO ☐ |
| IF YES THEN | |
| WHAT BANDWIDTH IS NEEDED REAL-TIME? | ___ KBPS |
| IS THE REAL-TIME DATA EMBEDDED IN COMPOSITE DL? | YES ☐ NO ☐ |
| IS THE DOWNLINK CCSDS COMPLIANT? | YES ☐ NO ☐ |
| IS THE REAL-TIME DATA CONTAINED IN VCO? | YES ☐ NO ☐ |
| DOES THE HOUSEKEEPING DATA NEED APP ID SORTING? | ☐ |
| | |
| WHAT IS THE COMPOSITE DOWNLINK DATA RATE? | ___ KBPS |
| DOES THE DOWNLINK DATA RATE? | YES ☐ NO |
| IF YES THEN | |
| WHAT IS THE SUBCARRIER FREQUENCY? | ___ MHZ ☐ |
| WHAT IS THE DATA RATE? | ___ KBPS |
| WHAT IS THE MODULATION TYPE? | BPSK ☐ QPSK ☐ |

Fig. 20.2

| VENDOR | PART | DESCRIPTION | QTY |
|---|---|---|---|
| MICRODYNE | 700MR | TELEMETRY RADIO RECEIVER | 2 |
| DECOM SYSTEMS | 7715 | BIT SYNCHRONIZER | 2 |
| MICRODYNE | 1620-PC | DIVERSITY RADIO COMBINER | 1 |
| HP | E4421A | ESG3000A RF SIG GENERATOR | 1 |
| HP | E4432A | ESGD3000A RF EXCITER GENERATOR | 2 |
| GDP | 782 | SUBCARRIER GENERATOR | 2 |
| USPACENET | ACU30 | 3 METER ANTENNA ACU | 1 |
| USPACENET | ACU50 | 5 METER ANTENNA ACU | 1 |
| APOGEE LABS | 2920-030 | TELECOMMAND UNIT | 2 |
| APOGEE LABS | 2920-010 | ENVIRONMENTAL AND STATUS COLLECTOR | 1 |
| USPACENET | DQM100 | DEMOD/FRAME SYNC QUALITY BOX | 1 |
| USPACENET | SWT100 | DATA PATH SWITCH BOX | 1 |
| GDP | 615 | BIT ERROR RATE TEST UNIT | 1 |
| BEST POWER | FE7KVA | UPS POWER SYSTEM | 1 |
| TSI/TELSIS | VIP | CCSDS PROCESSOR (MONITOR PORT ONLY) | 2 |
| HP | 8562E | SPECTRUM ANALYZER | 1 |
| USPACENET | BOR100 | BORESIGHT RF TEST SOURCE | 1 |
| TRUE TIME | XLDC602 | GPS TIME CODE UNIT | 1 |
| MITEQ | D9406 | DOWNCONVERTOR | 1 |
| OPTRAX | SS300B | VIDEO MATRIX SWITCH | 1 |
| APOGEE SOLUTIONS | TORBEN | 5 METER HAWAII ANTENNA ACU | 1 |
| APOGEE SOLUTIONS | TORBEN | X BAND RECEIVER | 1 |

Fig. 21

MULTIPLE ACCESS SATELLITE COMMUNICATIONS NETWORK

This is a continuation-in-part of application Ser. No. 08/957,643 filed Oct. 24, 1997 now U.S. Pat. No. 5,940,739 the entire content of which is incorporated herein by reference.

BACKGROUND OF THE INVENTION

The present invention relates generally to ground stations for communicating with and controlling satellites, and more particularly to a shared ground station for communicating with and controlling multiple independently launched and operated satellites simultaneously.

Ever since the launch of Sputnik in 1957 and the resulting ground swell of science education that resulted, satellites and satellite technology have played a major role in the advancement of space and communication technology. All manner of communication signals ranging from telephone, microwave, television and others can be transmitted over satellite communication links. In addition, a wide range of scientific and technical data can be gathered from specially designed satellite equipment to monitor weather and other physical phenomenon.

There are two primary types of orbits that are used for communication satellites. The first is a geostationary (GEO) orbit. A satellite placed into a geostationary orbit completes one revolution around the Earth in exactly the same amount of time that it takes the Earth to complete one revolution on its axis. Although the satellite is rapidly moving traveling around the Earth, the satellite appears to observers on the ground to be fixed in space above the Earth. A satellite in GEO orbit is approximately 22,300 miles above the Earth. Even at the speed of light, the period of time required to send and receive a radio signal over that distance (which is known as "latency") is about 0.24 seconds, which is unacceptable long for anything approaching real-time transmission. In addition, the relatively long distance requires higher power transmitters, and bigger antennas, which means more weight and greater costs to produce and launch a satellite into GEO orbit.

However, there are other advantages to a GEO orbit. From the relatively long distance from Earth, a much larger area falls within the reach of the satellite transmitter. Thus, a small number of satellites in GEO orbit can be used to provide coverage over all of the Earth's surface. Conversely, a large number of satellites are required to provide similar coverage for just the opposite reason, i.e., the satellite transmitter falls on a much smaller surface area of the Earth.

In order to solve the latency problem, which is critical to achieving a commercially successful communication system, satellites can be placed into Low Earth Orbit (LEO), which is typically 500–1500 miles from Earth. At this much shorter distance, the satellites orbit the Earth about once every ninety minutes. At LEO distance, the latency is on the order of hundredths of a second. With the satellites located about an order of magnitude closer to the Earth, the transmitter can be much smaller and lower powered. However, the surface area on the Earth that is in range of a transmitter of a satellite in LEO is much smaller than if the satellite were in a GEO orbit. Therefore, many more satellites need to be launched into orbit in order to provide sufficient surface area coverage, although the launch costs for a LEO satellite are usually lower.

When satellites first were used, almost all satellites were manufactured and launched by national governments. At that time, the cost was far too high for commercial ventures, particularly in light of the small benefits and the high risks. In the beginning, the infrastructure did not exist to take advantage of the communication capabilities of satellites. Television was in its infancy and the enormous need to telecommunication that exists today had not even begun to develop.

However, as integrated circuit technology advanced, microprocessors became more powerful and memory prices plummeted, the cost to produce cellular phones, microwave transmitters, and other communications devices has radically decreased. This decrease in prices has led to an enormous increase in the telecommunications market. All telephone area codes, assigned under an earlier set of rules, have been allocated and a new area code assignment scheme had to be implemented to accommodate the rapid growth and the increase in phone numbers needed due to increased use of modems, facsimile machines, pagers, and of course, telephones.

Now, that the telecommunications market is of sufficient size, commercial entities can profitably operate satellite systems. A number of commercial companies have implemented their own satellite communication programs. As discussed earlier, the LEO orbits, which require smaller and less expensive satellites would require the launching of hundreds of commercially owned private satellites.

There are four major costs involved in a satellite communication network. These are manufacturing the satellite, launching the satellite, equipment and overhead to communicate with the satellite and general administrative overhead.

Initially, communication equipment requirements were met by companies building and maintaining their own ground-based communications stations. For a LEO, depending on the type of orbit and the altitude of the satellite, the satellite will be in communication with a single fixed ground station for only a few minutes during each rotation of the Earth. For example, for a typical LEO satellite orbiting the Earth in a polar orbit, a ground station located at the equator only has access to the satellite for about four minutes a day. If there was a need to communicate with the satellite for a longer period of time, then the company would have to either place more satellites in orbit or build more ground stations, to achieve communications for a longer period of time. This might require up to 6–8 ground stations at a cost of over $2.5 million per ground station. This figure represents a major cost of initiating a satellite based communication system, and hence a major impediment to the entry of smaller players into the satellite communications market.

It is known to receive data from multiple satellites using a common ground station. For example, U.S. Pat. No. 5,603,077 discloses a satellite system and method for remote control of a satellite signal receiver. However, the system and method disclosed therein operates with geostationary satellites under the control of the same operator. Furthermore, this system and method does not provide the ability to transmit to any arbitrary satellite.

U.S. Pat. No. 5,579,367 also discloses a system in which reception of signals from multiple satellites is controlled by a network controller. This system also cannot provide two-way communication with arbitrary LEO and GEO satellites.

In sum, simply providing communications reception is not sufficient to enable a satellite owner to manage and control the satellite owner's satellite. Each satellite requires its own unique setup in a ground station, both for transmission and reception. Furthermore, each satellite must be tracked independently of other satellites, and each satellite must be controlled potentially several times a day (or at least a month). Moreover, the operators of each satellite do not necessarily communicate with each other to resolve conflicts and establish communication standards, which are required to use existing ground stations.

The present invention is therefore directed to the problem of developing a ground station system for communicating with any arbitrary satellite, which can be shared among a number of users, including those of LEO and GEO satellites, thus eliminating the great expense of building and maintaining a private satellite communication system.

The present invention is also directed to providing a graphical user interface for each user to enable each user to directly communicate with a scheduling computer, and to transfer user data to the scheduling computer, which scheduling computer coordinates user data from a number of users, resolves conflicts, and uploads the data transferred to the ground stations to the proper orbiting satellite.

Furthermore, the present invention is also directed to providing a communication network by which an owner of the satellite can remotely communicate with the scheduling computer of the service provider to submit commands to be transmitted to the satellite, and to receive data streams returned from the satellite, which data can either be stored in the scheduling computer and passed onto the user at a later time or forwarded to the user in real time.

SUMMARY OF THE INVENTION

The present invention solves these and other problem by providing a remotely controlled ground station that can be operated and controlled from a central controller. Furthermore, the present invention provides that each user creates and stores a ground station configuration file at the central controller, which file contains the data necessary to configure the remotely controlled ground station to communicate with the user's satellite. Thus, when the user desires to communicate with the user's satellite, the user schedules a communication session with the central controller, which downloads the configuration file to the appropriate ground station. The appropriate ground station is determined based on current orbital characteristics of the satellite in question. A server at the ground station then uses the data in the configuration file to configure the equipment at the ground station to communicate with the desired satellite.

The present invention relates to a method for sharing a single system of ground stations between any number of arbitrary satellite owners, thus permitting the owners to transfer command information to their satellite, and collect data streams that are sent back from the satellite all via a standardized global communications system.

The present invention includes a graphical user interface that allows the user to prepare data to be communicated to a satellite at the user's usual place of business. Usually, the data comprises a set of commands to be sent to a particular satellite which will cause a desired and expected response from the satellite. The data is then transmitted to a central controller. The data can be prepared ahead of time and transmitted at one time to the central controller, or the user can communicate online directly with the central controller and input the data directly to the central controller. In addition, the user can communicate with the central controller via an Internet browser, which communicates with a web page on a web server associated with the central controller. By one of the above described methods or any other way in which data can reasonably be transmitted to the central controller, a set of data—which includes such information as the target satellite, from which ground station should the data be transmitted, which pass of the target satellite should be utilized and whether data should be anticipated to be received during this pass from the satellite—is now stored at the central controller.

The central controller then transmits this data to one of the plurality of remotely controlled ground stations best suited to communicate with the specified satellite at the specified time.

One exemplary embodiment of the graphical user interface includes a computer, such as a desktop computer, and associated software.

One exemplary embodiment of the central controller includes a computer, such as an engineering workstation, and associated software.

An exemplary embodiment of the remotely controlled ground station includes an RF transmitter, and RF receiver, and a transmission controller.

The present invention also includes a method of communicating with a plurality of users, which includes the steps of acquiring data from the plurality of users, and transmitting that data to a central controller, which stores the data. The method also includes the steps of identifying and resolving transmission, equipment communication link, and other scheduling conflicts, and then transferring the data to be transmitted to the appropriate ground station on an as needed basis. The ground station transmits to the appropriate satellite, which is selected based upon the schedule established by the central controller, the data acquired from the user. If there is data downloaded from the satellite during the same pass, that data is temporarily stored by the ground station and then transferred to the central controller for forwarding to the particular user.

One exemplary embodiment for communicating between the user and the central controller and the remotely controlled ground stations, is by using a web browser communicating over an Internet connection to a web server that is programmed to store and display information about the satellites. This method of implementing communication between the user and the central controller is very effective because of universal access to the Internet. There are a large number of independent Internet service providers that make access to the Internet very simple and easily accomplished just about anywhere in the world.

It is important to differentiate the use of the Internet as a physical communication apparatus and the user of a web browser, which interprets and implements Hyper Text Markup Language (HML) files. Though use of a web browser is currently the most popular way to communicate over the Internet, there will certainly be major growth and changes in the software used to communicate over the Internet. At some point people may no longer be using a web browser and its underlying HTML files, but may communicate using some completely different software protocol. Thus, one aspect of the present invention relates to communication over a global network which utilizes a server computer that stores and implements a program written in a special communication language. The end user operates a client version of that same software to enable the end user to interact with the client computer receiving the files of the special communication language. Those files are then interpreted by the client software to enable the user to view and read the resulting presentation of text and graphics, input data, and transmit that data to the server computer via the Internet network.

BRIEF DESCRIPTION OF THE DRAWINGS

FIGS. 7a–b depict the remote control topology used in the object oriented control for the remote ground stations of an exemplary embodiment of the present invention.

FIG. 7 depicts the web pages and links of an exemplary graphical user interface according to the present invention.

FIGS. 8–19 depict various exemplary web pages of the graphical user interface according to the present invention.

FIG. 20 depicts a list of user specifiable information used to configure the remotely controlled ground station according to the present invention.

FIG. 21 depicts an exemplary list of equipment used in a remotely controlled ground station according to the present invention.

DETAILED DESCRIPTION

Figure 1:
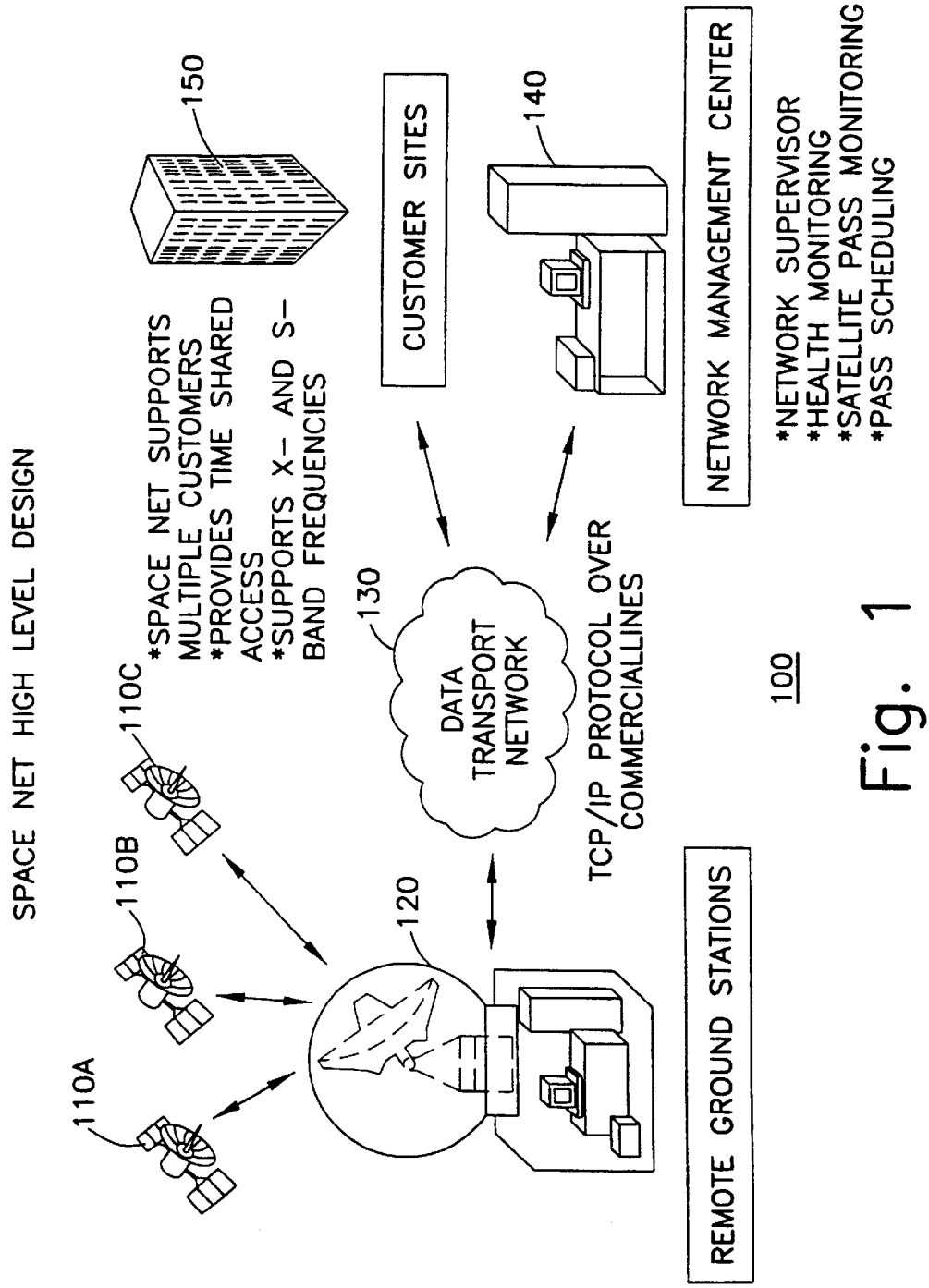
FIG. 1 depicts a schematic diagram of one exemplary embodiment of a system according to the present invention.

Referring to FIG. 1, an exemplary embodiment of one aspect of the present invention is depicted. Shown in FIG. 1 is a multiple access satellite communications network 100 in a schematic view. Satellites 110 are a plurality of independently launched and operated satellites, which are operated by customers of the service providers who own multiple access satellite communications network 100. Each of these satellites 110 requires potentially different communication formats and protocols. In fact, each of these satellites 110 is designed without taking into account the required communication protocols and formats of the other satellites 100, and without necessarily consulting the owners of the remotely controlled ground station. Moreover, each of these satellites 110 does not know or care about the existence of the other satellites 110, i.e., they operate without any cooperation. In fact, these satellites may even be owned by different governments or by entities from other countries, whose priorities are potentially different and may even interfere with one another. One desire the operators of all these satellites share, however, is the desire to reduce costs. Consequently, each of these satellites 110 share a common system of ground stations 120.

As a result, satellites 110 are in communication with remote ground stations 120 during certain periods of the orbit of the satellites. Though shown in this FIG. 1 as a single station, there can be a plurality of stations where needed to provide maximum available communication time with the satellites 110. Ideally, these remote ground stations are located in strategic positions throughout the world, such as the polar latitudes to provide longer view times for the satellites as they orbit the world in LEO. One possible implementation of these remote ground stations is to locate them in Alaska, Norway, Chile, South Africa, Hawaii, Pennsylvania, Russia, etc.

The present invention, however, is not limited to LEO satellites. It is equally applicable to satellites in any orbit, such as GEO, mid-earth orbit (MEO-s) and highly elliptical orbits (HEO's). In such cases, ground stations located in equatorial regions may be more useful.

The present invention is particularly useful, however, to LEO's as it enables satellite systems having both low cost launches and low cost operations. By sharing the cost of the ground station among many users, or by charging a user only for the time the user actually makes uses of the ground station, the user can minimize his operational costs. Furthermore, by charging satellite operators on a per use basis, the present invention makes owning and operating a network of remotely controlled ground stations profitable. For example, even with a large number of satellites in a single system of satellites, a dedicated system of ground stations include significant periods of under-utilization. In contrast, the present invention makes possible a system of ground stations that can approach maximum utilization, thereby converting a previously non-profitable enterprise to a highly profitable one.

Turning to FIG. 1 again, remote ground stations 120 are in communication with the data transport network 130. Network management center 140 is in communication with data transport network 130. Customer sites 150 are also in communication with data transport network 130. Though shown in FIG. 1 as a single location, customer site 150 can be a plurality of sites from a number of independent satellite owners, users or operators. Because each of remote ground station 120, network management center 140, and customer site 150 are in communication with data transport network 130, each of the three locations may communicate with either or both of the other two locations. Thus, the remote ground stations 120, the network management center 140 and the customer sites 150 are "networked" together.

In normal operation, a user at customer site 150 can communicate with the network management center 140 and transfer a series of commands to be transmitted to the intended target satellite. These commands are intended to effectuate required activity by the satellite in question, once the commands have been transmitted to the satellite. Such activity might include instructions to onboard cameras to acquire data from certain locations on Earth, collect radio signals at certain frequencies or transmit back to Earth certain data that has already been collected by the satellite. The commands are passed from the customer site 150 to the network management center 140 and stored therein.

The network management center 140 will store all of the commands from any number of customer sites 150. The network management center 140 has access to orbital and ephemeris data for all satellites in question and is able to determine which remote ground station 120 is best situated to transmit the commands to the satellites 110. Alternatively, the user may be presented with this information and asked from which ground station the user prefers to communicate. Although more than one remote ground station 120 may have a view of a satellite for a particular session, the projected received signal strength may be higher at one ground station 120 than another, making one ground station more optimum for a projected communication session than another ground station. For example, a higher received signal strength will enable a communication session to occur at a higher data rate with the same error rate, thus reducing the length of the communication session and enabling more communication sessions per unit time.

The orbital and ephemeris data is updated regularly to account for changes in the satellites' expected positions. This information is available from publicly accessible sources, e.g., the U.S. government. Satellites in LEO usually take about 90 minutes to orbit the Earth, and during that 90 minutes, the satellites are properly positioned to transmit or receive data for only 10–15 minutes (from a particular location on the Earth's surface). Because a remote ground station antenna can only communicate with one satellite 110 at a time, scheduling the most efficient use of transmission time is critical. Network management center 140 also schedules all the requests and supports optimizing when and from what remote ground station 120 each set of commands should be transmitted. If the command instructions call for data to be transmitted back to Earth, the time when the data is ready and the period of time that it will take to retrieve the data are all taken into account.

Once the scheduling has been calculated, network management center 140 transmits over data transport network 130 to remote ground station 120 the information needed to handle each transmission and reception for each communication request. This information is used to configure the equipment at the remote ground station for the next communication session. This information includes the satellite location in the sky, the projected path during the transmission/reception of data, which path the antenna at the remote ground station must track, the communication format and protocols required to properly establish a communication link with the satellite, e.g., any required encryption, the operating frequency, the modulation format, the bit rate, the data format, the error correction scheme, the window of operation, etc. Further, this information includes any other parameters required to communicate with the satellite, which may be unique to a particular satellite, which are known to those of skill in the art. The remote ground station 120 uses this information to control the communication equipment at the remote ground station 120, so that the user effectively controls the user's communication session remotely from the user site 150.

To accomplish this remote control, the remote ground station employs a station control computer coupled to the data transport network, which station control computer receives the information from the network management center 140. This station control computer then parses the information into the control settings for each device in the remote ground station that must be configured to communicate properly with the desired satellite. The station control computer is coupled to each of the devices (e.g., via IEEE RS 232 control lines) in the remote ground station, and adjusts the settings of each of these devices in accordance with the instructions contained in the information passed from the network management center.

Figure 2:
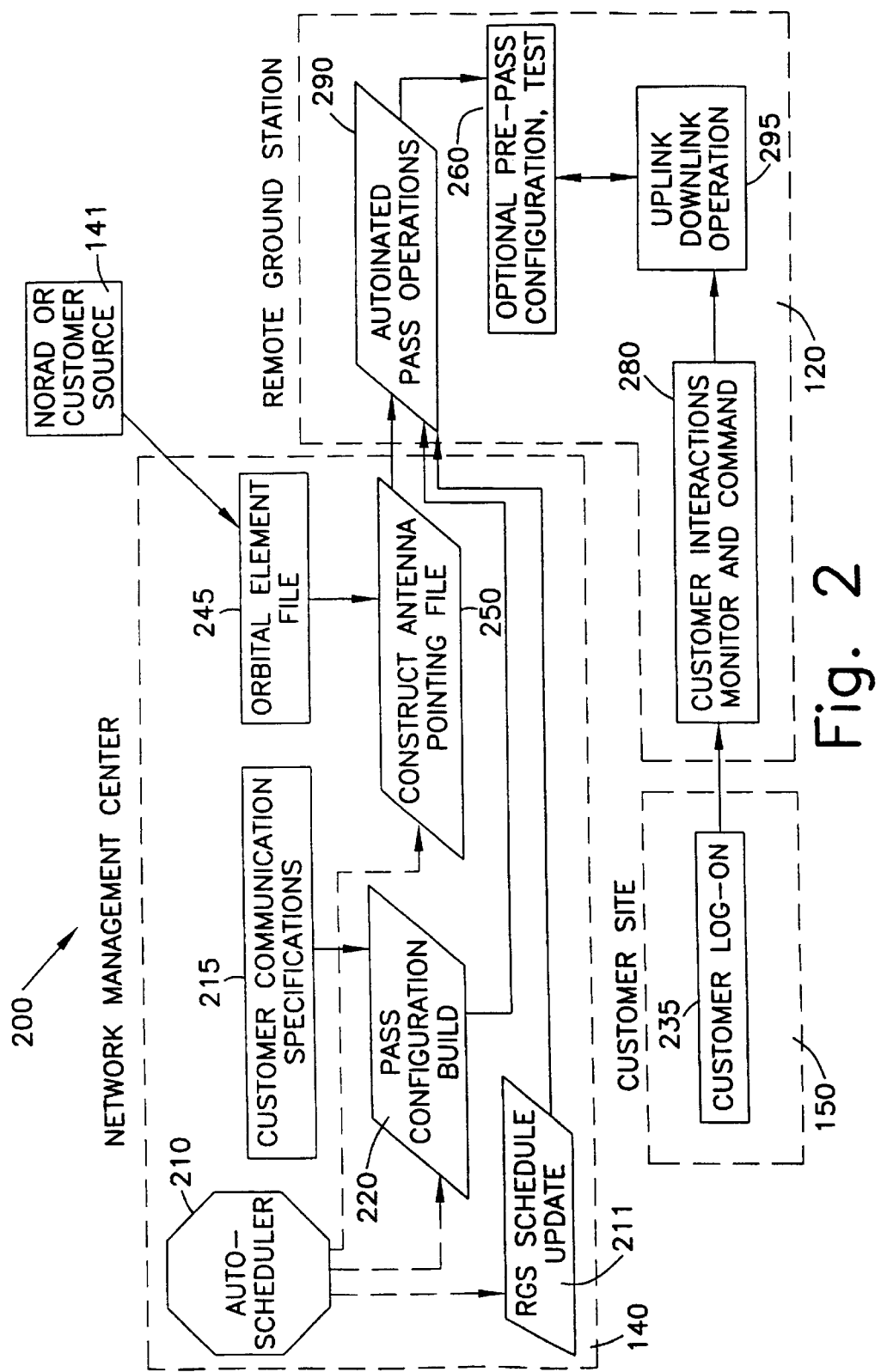
FIG. 2 depicts a flow chart showing the logic of events during an actual pass of a satellite and communication and events that take place during that pass according to one exemplary embodiment of a method according to the present invention.

Referring now to FIG. 2, a discussion of the events that take place at a remote ground station just prior to and during a pass of a satellite over a ground station. Within the network management center 140 is an autoscheduler function 210, a customer communication specifications file 215, a pass configuration build function 220, an orbital elements file 245, a construct antenna pointing file 250 and a remote ground station schedule updating function 211. The autoscheduler 210 controls the RGS schedule updating 211, the pass configuration build function 220 and creates the construct antenna pointing file 250. Input to the orbital elements file 245 is data from NORAD or customer source regarding the ephemeris data of the satellite of interest. The dotted lines in FIG. 2 denote control functions.

Data output from the network management center is from the construct antenna pointing file 250 and the RGS schedule update function 211 into the automated pass operations 290. The automated pass operations 290 sends its data to the optional pre-pass configuration test 260.

At the customer site 150, the customer logs-on 235 and establishes communication with the customer interactions monitor and command element 280 in the remote ground station 120. The customer interactions monitor and command element 280 then establishes the uplink and downlink operation 295 in accordance with the optional pre-pass configuration test 260.

The auto-scheduler 210, which stores the schedule information and is part of the network management center 140. At any time prior to a scheduled pass of a satellite 110, auto-scheduler 210 passes instructions to the remote ground station 120, to begin preparing to communicate with the scheduled satellite. Information needed to configure the remote ground station 120 is stored in the customer communications specifications file 215. The data stored in the customer communications specifications file 215 is transferred to the pass configuration build module 220. The pass configuration build 220 utilizes the data obtained from customer configuration file 215 and sends the needed commands to the construct antenna pointing file 250. The construct antenna pointing file 250 receives information from the orbital elements file 245 to properly initialize and configure the antenna and radio frequencies to communicate with the particular satellite, which in turn obtains ephemeris data regarding the satellite of interest from NORAD or customer source 141.

After configuration, the system passes control to the pre-pass calibration test module 260, which performs a series of system checks just prior to the scheduled time for the satellite to appear within communication range. Once the satellite 110 has risen far enough above the horizon, a communication link is established and the data that was input by the user at the customer site 150 is transmitted to the satellite 110. If the input that was transferred to the satellite 110 calls for immediate data collection, then data is returned via the downlink frequencies, which could be S-band or X-band, for example. Other frequencies are possible, as the remote ground station employs relatively wideband transmitters/receivers, power amplifiers and antennae.

At the same time that the auto-scheduler 210 initiates the configuration activities, the auto-scheduler 210 also initiates the remote ground station access prompt to the customer. This module communicates over the data transport network 130 with the customer site 150 and alerts the customer site 150 of the upcoming satellite pass. If the customer wishes to monitor the pass real time the customer is able to via the graphical user interface, which is discussed below, otherwise, the software at the customer site 150 initiates a customer log-on 235. Once the customer log-on 235 is initiated, it authenticates the customer access by testing for previously established verification codes provided by the customer log-on module 235, then data collected during the pass is transmitted back to the customer.

Figure 3:
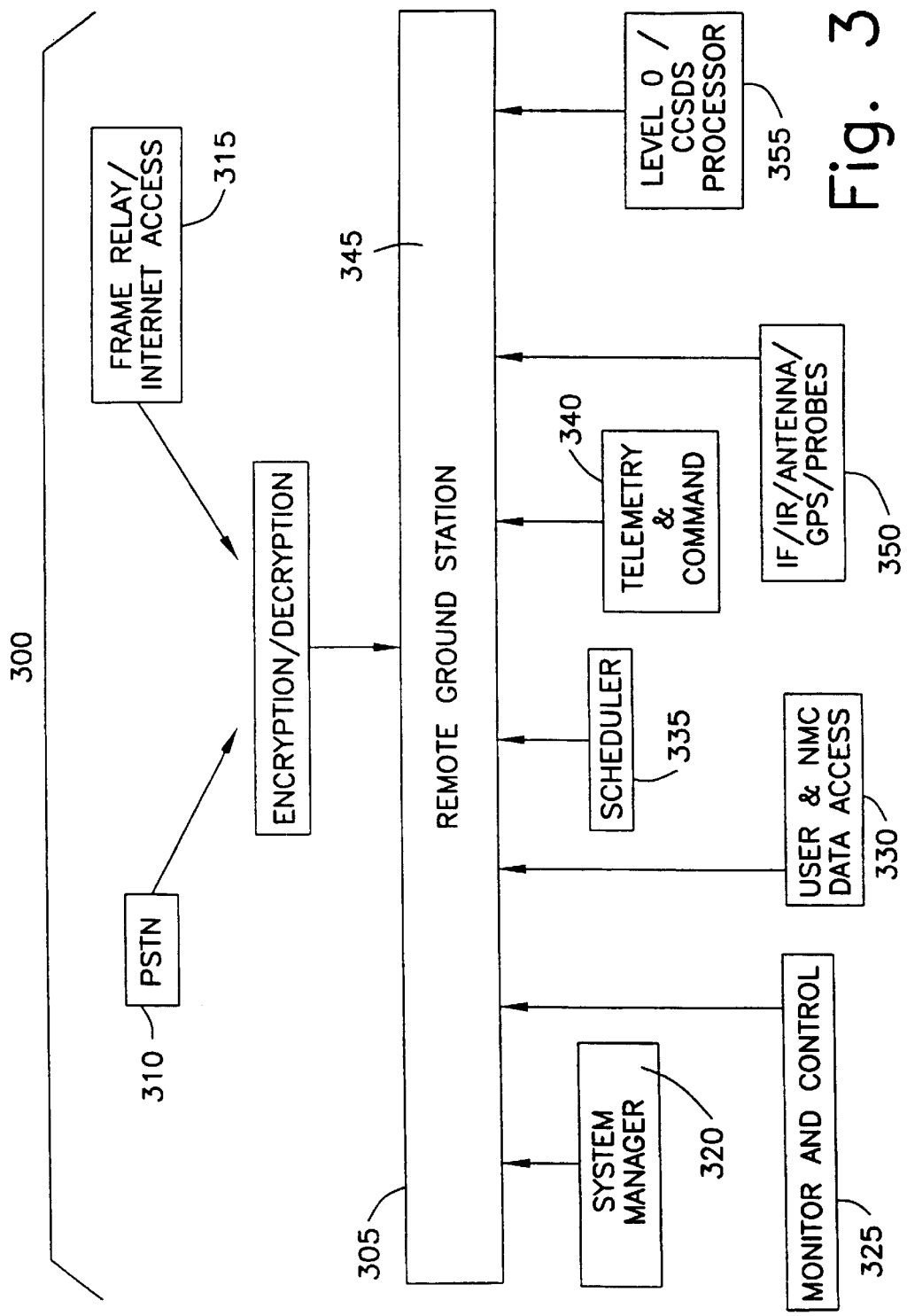
FIG. 3 depicts a functional diagram of one exemplary embodiment of an apparatus according to the present invention.

Referring now to FIG. 3, a discussion follows concerning the functional design of the remote ground station 300. The functional core of the remote ground station 300 is the remote ground station system server 305, which is typically implemented as a UNIX, Windows NT, or similar workstation. The workstation handles all of the calculations, hardware controls and customer sensors I/O needed to operate the remote ground station system 300.

The remote ground station system server 305 is connected to other components of the system by communication over the public switched telephone network (PSTN) 310 or by communication via a frame relay transmission network 315. As the public switched telephone network 310 communicates at a slower rate, the public switched telephone network 310 is used to communicate low priority and smaller sized messages and is also used for back-up communications purposes. Examples of messages sent via the PSTN 310 include administrative files, pass data and data that has not been requested to be sent real time. On the other hand, the frame relay transmission network 315 operates over T1 lines and is able to communicate much larger packets of data in real-time. This route is reserved for those satellite communications sessions in which the user has requested real time control or real time telemetry.

Overall systems handing is controlled by the system manager 320 which includes server backup software, frame relay and PSTN management and low level system software.

The monitor and control function 325 includes general system overhead and remote ground station diagnostics. Each of the diagnostics is available to the user via The graphical user interface and to operators at the network management center.

The user and NMC data access module 330 includes maintaining the graphical user interface (GUI), controlling user and NMC access functions, S/C configuration, updating satellite orbit data, and maintaining the RGS database.

The schedule module 335 takes orbit information and the pass schedule from the NMC and generates antenna track sequences, station configuration plans and user interface plans for each pass, all-pass and pass events are directed and managed by the schedule module. The information needed by the schedule module 335 is obtained via the public switched telephone network (PSTN) 310 or the frame relay transmission network 315.

The telemetry and command module 340 handles the actual real time communication with the satellite and all other necessary data processing operations, including the uplink of command data and the downlink of telemetry data. Pass data is stored and forwarded according to the user configured pass configuration file.

Three minutes before each scheduled pass the telemetry and command module 340 configures all necessary communication gear to match the intended satellite and pass requirements, a final check is performed, the antenna is slewed to the required position and data acquisition begins. A number of real time data can be passed immediately back to the user if the pass has been so configured. A combination of the telemetry and ancillary pass data is stored at the remote ground station 120 until such time as a confirmed copy has been transferred to the customer site 150 or the network management center 140.

The remote ground station system server 305 includes a series of hardware I/0 interface connections 345, such as a PCI Bus, IEEE bus, and an RS232 port. These hardware I/0 interface connections 345 allow various external sensors, monitors, receivers and test equipment to be connected to the remote ground station system server 305.

One group of these sensors, collectively called the IF/IR/Antenna/GPS and probes 350 gather various types of local data including all forms of meteorological data, internal hardware operating parameters, radio frequency diagnostics, power amplifiers, etc.

A second group type of function is directed toward the frame relay communication requirements. The Level 0/CCSDS Processor 355 handles the low level packet processing for the monitor and control function 325. Such functions include frame synchronization and Level 0 processing, which is the separation of the data stream into the various types of data being transmitted.

It should be understood that although the present invention has been discussed in terms of communicating with orbiting satellites, it can also be used to communicate with spacecraft, rockets, moons, planets, asteroids, satellites in geostationary orbits, satellites in low Earth orbits, and other natural and man-made objects that can be configured in such a manner as to be able to communicate with the present invention. Thus, all references to satellites or orbiting satellites shall be considered to include all of the above listed items.

The present invention thus enables smaller entities to own and "operate" their own dedicated satellites, thus freeing them from the constraints of time-sharing a satellite that is not specifically designed for their needs. For example, universities can now afford to own their own satellite due to the decreased costs of manufacturing satellites, and now by eliminating the need for a ground station from the total cost.

Furthermore, the lower cost satellites are usually placed in LEO orbits, which require multiple ground stations placed throughout the world to enable continuous communication with the LEO satellite. Consequently, only systems of satellites and corresponding systems of ground stations are currently possible. The present invention frees systems of satellites from the requirement of also building systems of ground stations, each placed throughout the world, which means purchasing/leasing property in several foreign countries, which can be a time consuming process. One system of ground stations networked and controlled according to the present invention can service many satellites, perhaps up to the hundreds.

Exemplary Embodiment

Figure 4:
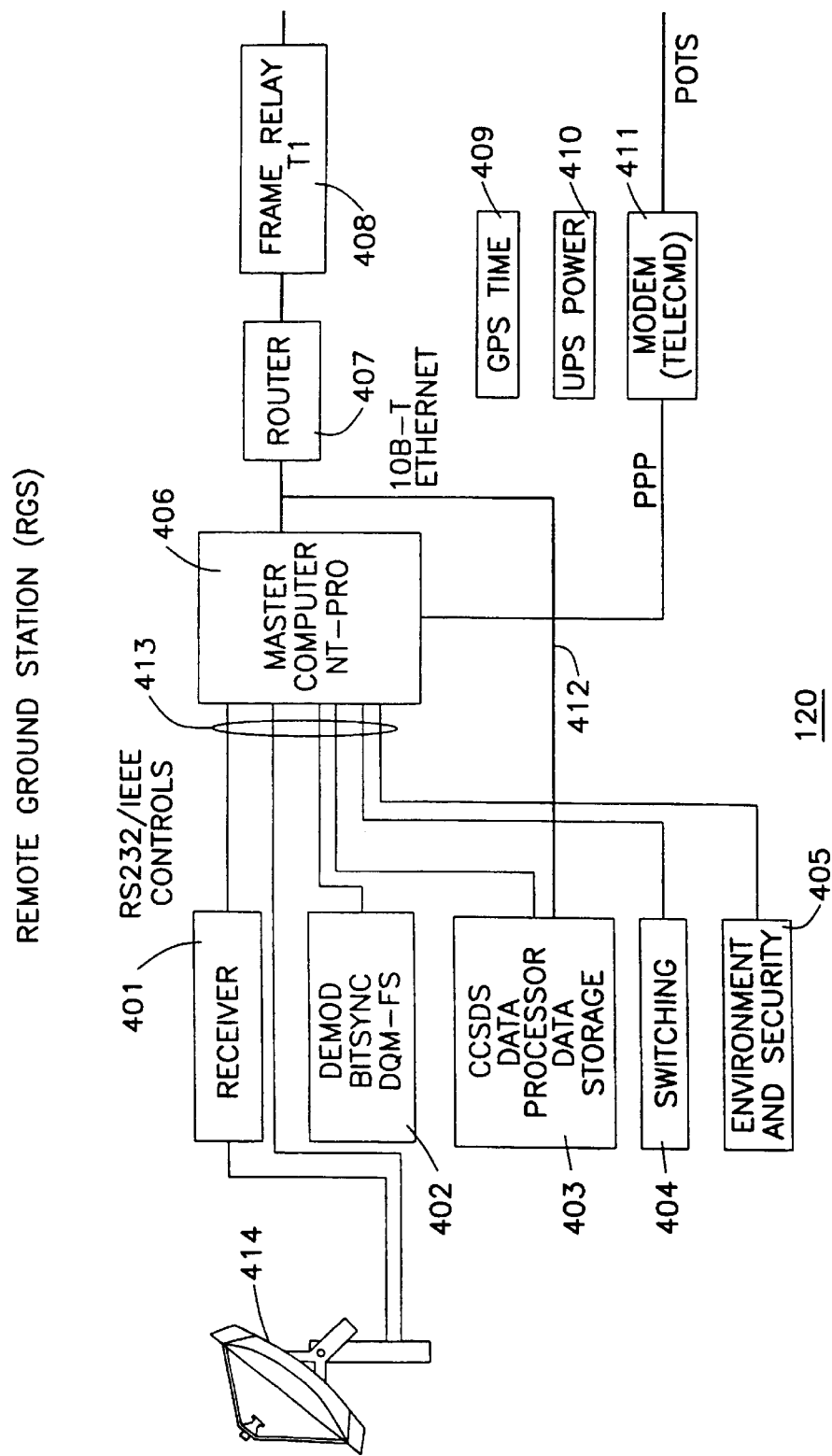
FIGS. 4–6 depict three exemplary embodiments of the remotely controlled ground stations used in the apparatus of the present invention.

One exemplary embodiment of the present invention is depicted in FIG. 4. The system therein is composed of a set of Remote Ground Stations (RGSs) located at strategic sites on the Earth's surface. All of the RGSs are connected via standard wide area network connections to a supervisory controller termed the Network Management Center (NMC). Customers use a common Netscape or Internet Explorer browser running on a personal computer (PC) to connect into the system of the present invention to easily communicate with their satellites from anywhere in the world.

Turning to FIG. 4, a receive only version of a remote ground station is depicted. Shown therein, a satellite antenna 414 receives the RF signal from a satellite in orbit and passes the RF signal to receiver 401. A low power amplifier (not shown) amplifies the low level RF signal to levels sufficient to reach receiver 401. The parameters of receiver 401 are controlled by master computer 406 (which could be a server, such as an NT-Pro) via IEEE RS 232 controls. The master computer also controls the positioning of the antenna 401. The demodulator, bit synchronizer and frame synchronizer are shown schematically as element 402, also under the control of the master computer 406. The output of the demodulator 402 is coupled to the CCSDS data processor and data storage 403 (also controlled by master computer 406). The data processor outputs the data to router 407 via a 10B-T ethernet line 412. If the data is intended for the user in real-time, then the data is transmitted to the user via the frame relay T1 line 408. If the data is to be forwarded to the user at some later time, the data can be slowly downloaded to the network management center via the modem 411 and the POTS using a PPP format. Time is provided by GPS time 409. Backup power is provided by uninterruptable power supply 410. Switch 404 is a cross-point type of switch for switching between radio frequency and other high frequency interconnects between equipment. Switch 404 enables the signal processing equipment boxes to be interconnected in different arrangements to support different kinds of communication requirements such as connecting one of two possible antennas or one of four different receivers into a signal processing configuration. Element 405 provides environment and security diagnostics, which are reported to master computer 406 and thus available to the network management center and the user.

Figure 5:
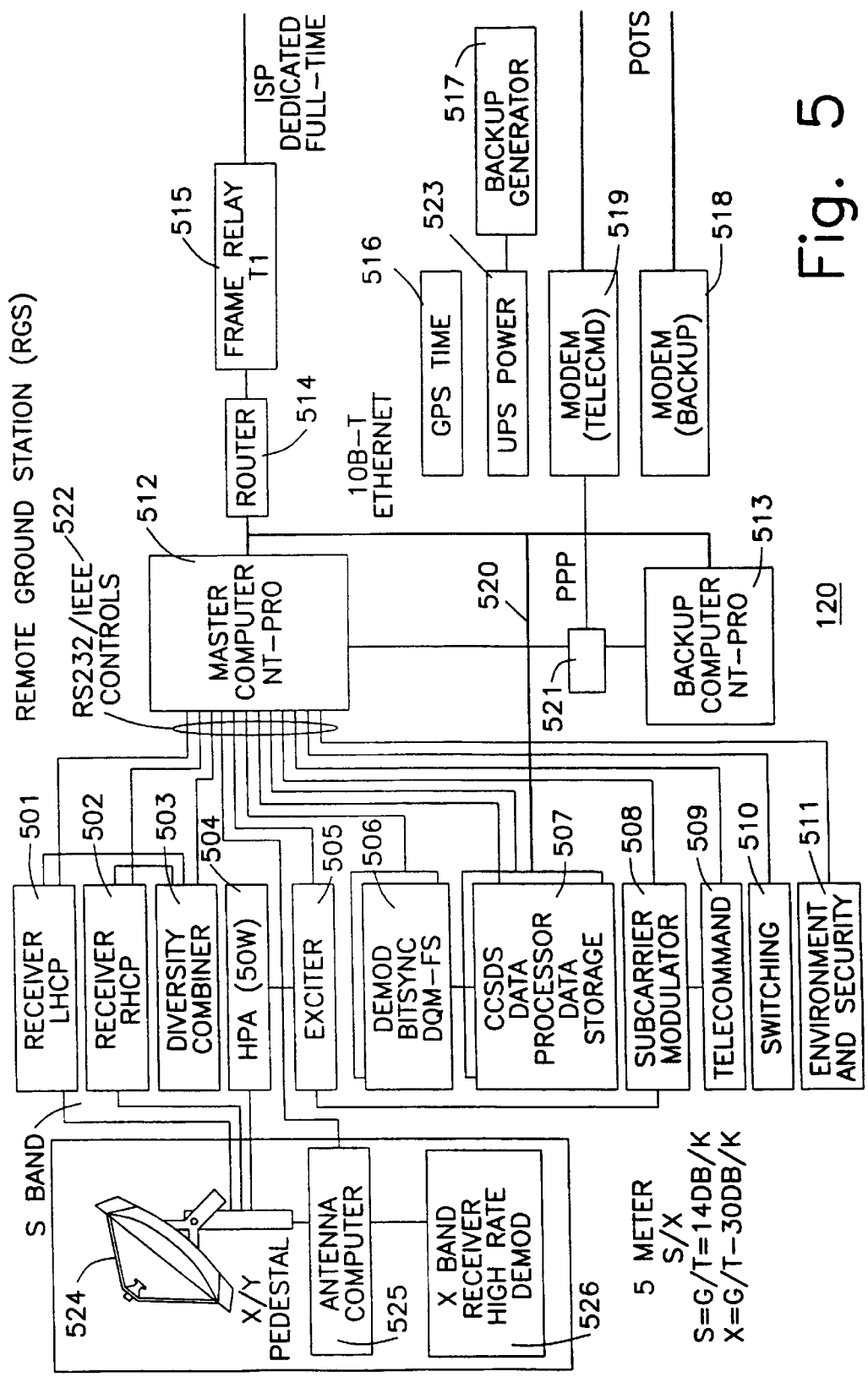

Turning to FIG. 5, shown therein is a remotely controlled ground station having both transmit and receive capability. In this case, there are both a left hand circularly polarized receiver 501 and a right hand circularly polarized receiver 502, which are combined by diversity combiner 503, each of which 501, 502 and 503 are controlled by the master computer 512. The receive data path is as described in the discussion relative to FIG. 4. However, there are two frequency bands available in this embodiment—one for X-band and one for S-band. The S-band uses the two receivers 501 and 502. The X-band uses receiver 526, which is coupled to the antenna via antenna computer 525. In this exemplary embodiment, the antenna 524 is a 5 meter dish having both S-band and X-band receive/transmit capability. For S-band, the antenna has a G/T of 14 dB/K and for X-band the antenna has a G/T of 30 dB/K. The output of the antenna computer 525 is coupled to the master computer 512.

On the transmit side, a telecommand module 509 is coupled to the subcarrier modulator 508, which in turn is connected to the exciter 505. The output of the exciter is connected to the high power amplifier 504 (e.g., 50 Watt), which in turn is coupled to the antenna 524. Data is received at the ground station 120 either via the frame relay T1 line 515 or the POTS modem 518 or 519. Data from the frame relay T1 line is passed to the master computer 512 and/or the data processor 507 via a 10B-T ethernet connection.

A backup computer 513 is employed to provide complete redundancy for overall control. Switch 521 detects a failure in master computer 512 and switches backup computer 513 into place.

Figure 6:
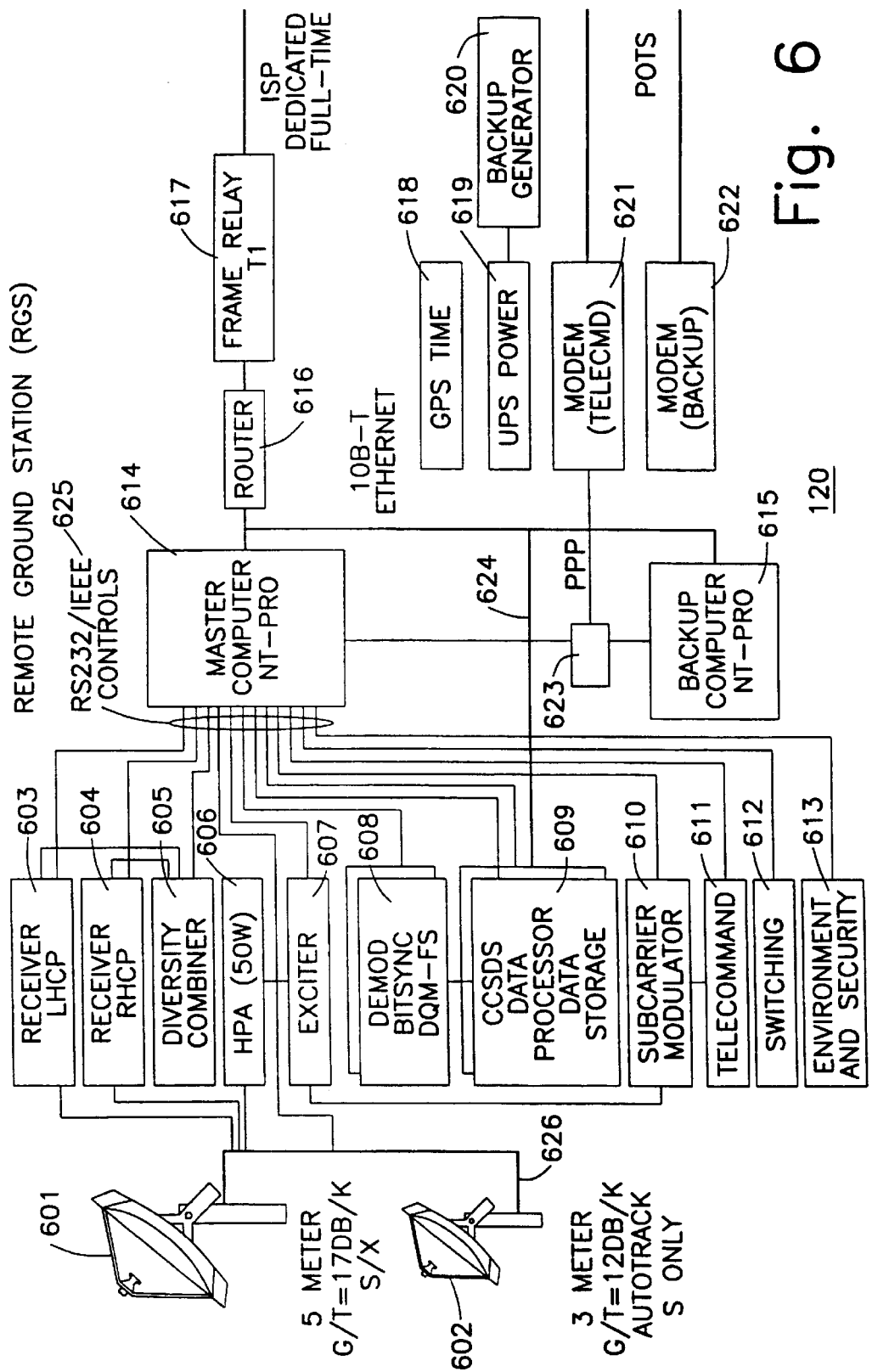

Turning to FIG. 6, a third exemplary embodiment of a remote ground station 30 is depicted. The only difference between the embodiment shown in FIG. 5 and the embodiment shown in FIG. 6 is the use of two dish antennas 601 and 602, which are coupled together by connection 626. Antenna 601 is a 5 meter dish having a 17 dB/K G/T at both S and X bands. Antenna 626 is a 3 meter autotrack antenna having a 12 dB/K G/T that operates only at S band.

The Remote Ground Stations receive supervisory commands from the Network Management Center that direct communications with satellites and perform general RGS housekeeping tasks. Equipment at an RGS is configured by the RGS local control computer prior to a satellite pass to support the required satellite communication.

Each of the ground stations has equipment to support communications with different kinds of satellites. To support a specific satellite pass, the RF receivers, bit synchronizers, telemetry data processors, signal generators, RF antenna, and other equipment is configured in advance of the satellite pass to provide the communications required by the user.

The system of the present invention is designed to communicate with large numbers of satellites in various orbits, such as LEO and GEO. Satellites in LEO typically orbit the Earth about once every 100 minutes. Most of the LEO satellites are in polar orbits to enable them to have regular visibility to the entire Earth's surface.

By virtue of a polar LEO satellite passing over the poles of the Earth on every orbit, communications access to such a satellite is provided about 4 times per day from a ground station located near one of the poles. Ground stations at lower latitudes (further from the poles) have frequent access to polar LEO satellites. Equatorial stations typically see a polar LEO satellite pass only 4 times per day, each pass with the ground station typically lasting about 10 minutes.

One aspect of the system of the present invention is that users schedule their satellite communications with the remote ground stations.

Graphical User Interface

The graphical user interface of the present invention includes a web browser operating on a computer, such as a personal computer or workstation. The web browser accesses a particular web site on a server connected to the Internet. For example, the user points his browser to "http://nmcl.spacelines.com" and enters this address in the address line of the browser. The server is typically located at the network management center.

Figure 9:
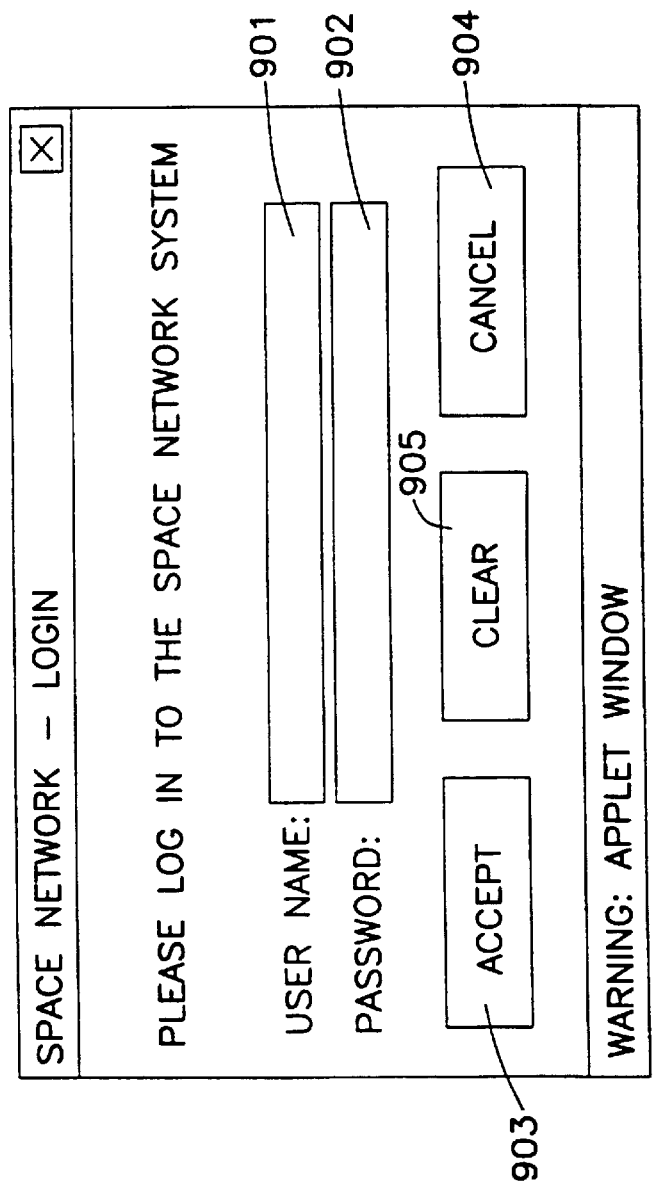

The first page presented to the user is the login page (FIG. 8). Upon clicking on the "Login to the Space Network system" button 801, the application opens the dialog box of FIG. 9 with fields for entering a user name 901 and password 902. Once entered, the user clicks on the "Accept" button 903.

Upon successfully logging in, the user is presented with the Welcome page shown in FIG. 10. At this point, there are five options available—"Display Space Network System Status" 1001, "View and Update Your Schedules" 1002, "Display Pass Execution of Your Satellite" 1003, "Retrieve Archived Data" 1004 and "Display Satellite Orbit" 1005—any of which can be selected by clicking on them, as they are hot links.

Selecting "Display Space Network System Status" 1001 takes the user to FIG. 11a, which depicts the system status. The web page depicted in FIG. 11a depicts the % usage of each resource in the system (1103–1107), the current logins 1101, the link rates (average and current), the percentage of capacity in use 1102. An alternate embodiment of this is depicted in FIG. 11b. FIG. 11a depicts the system overview screen presented to the user. In the exemplary embodiment of FIG. 11a, the screen depicts three remote ground stations 1105, 1106 and 1107 (one in Alaska, one in Hawaii, and one in Pennsylvania). In this case, there are two network management centers 1103, 1104, each networked together. The screen depicts the data rate (average and current) for each connection in use, the current logins 1101, and the percentage of capacity 1102 for each of the three ground stations (CPU, dish, network).

Figure 12:
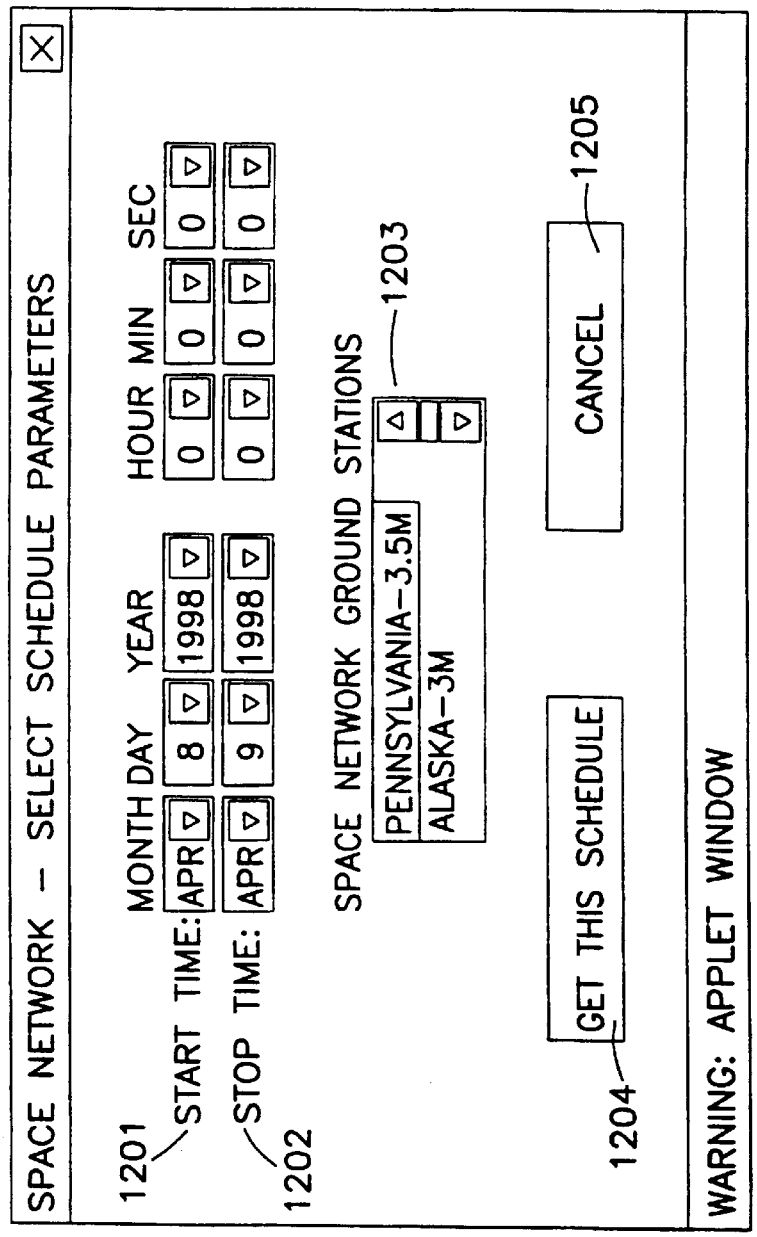

Selecting "View and Update Your Schedules" 1002 takes the user to FIG. 12.

The user can specify the start time 1201 (Month-Day-Year-Hour-Min-Sec), the stop time 1202 (same format as the start time), and the remote ground station 1203.

Upon clicking on "Get This Schedule" 1204, the user is able to retrieve and update the user's schedule(s) (e.g., FIG. 19).

Selecting "Display Pass Execution of Your Satellite" 1003 takes the user to FIG. 13, which shows the communication passes for the satellite, ground station(s) and period of interest. Each of the horizontal bars 1301–1303 in the lower right hand corner of the display represents the timeline of one of the ground stations. The small vertical bars 1304 within each horizontal bar indicate a pass of the satellite over the ground station. These are preferably a separate color from the horizontal bar, e.g., green on grey. More information can be displayed about a pass by clicking on the vertical bar representing a pass.

Clicking on the "New Pass" then a specific pass vertical bar flags (e.g., places another vertical bar 1305 on top of the other vertical bar) that pass for the user. Clicking on "Update Schedule" 1307 then confirms to the system that the user's flagged passes should be reserved for that user.

In the satellite pass request page (FIG. 11c), the user can specify the mission 1131, the satellite 1132, the uplink size 1133, the downlink size 1134, the priority of the session 1135 and the price of the session 1166. Once these fields are selected, the user clicks on the submit key 1137, which then lists the currently available pass slots in the lower half of the screen. There is shown the ground station from which the pass is available, the duration, at the start time for each selected satellite.

Selecting "Retrieve Archived Data" 1004 takes the user to FIG. 14. The Data Archive pages provides access to the system data archived from communication with the user's satellite. List 1401 shows the user all of the archived files available. By selecting a file and clicking on "Agree; Get Archived Data" 1402 takes the user to FIG. 15.

FIG. 15 depicts an example of a list of files in the user's Network Management Center archive directory. Clicking on an item 1501 in the list retrieves that file from the Network Management Center directory and displays the file contents in the user's browser window 1502.

Selecting "Display Satellite Orbit" 1005 takes the user to FIG. 16, which displays the real-time information about where a satellite is in its orbit. The current position is shown, for example, in latitude 1601, longitude 1602 and altitude 1603. A graph of the orbit is overlaid on a flat image of the world 1604. The satellite name and local and GMT time are indicated in box 1605.

FIG. 17 shows a video of the remote site enabling the viewing of environmental conditions and the moving antenna from remote cameras positioned at the remote ground stations. The site of interest is selected from a drop-down menu 1702 beneath the video display 1701.

FIGS. 18a–b depict the real-time signal monitoring presented to the user. During a user scheduled pass between a satellite and a ground station, the equipment at the ground station is automatically set up in advance of the pass to handle the satellite communications. The system provides remote monitoring of this equipment via the browser interface. An example for a bit synchronizer is shown in FIG. 18a. An example for a signal processor is shown in FIG. 11b.

TCP/IP Remote Control of a Ground Station

One aspect of the present invention is remote control of the remote ground stations. This includes is the ability to control, configure and receive status from all ground station equipment over the data network. The data network can be a Local Area Network (LAN), Wide Area Network (WAN) or open Internet. To attain this level of remote control, the present invention provides for single point access, remote equipment control, status, and equipment scheduling interface to all ground station equipment. Furthermore, each device is accessible via a TCP/IP network. To achieve the desired level of remote control, this aspect of the present invention employs an object-oriented design.

Figure 7B:
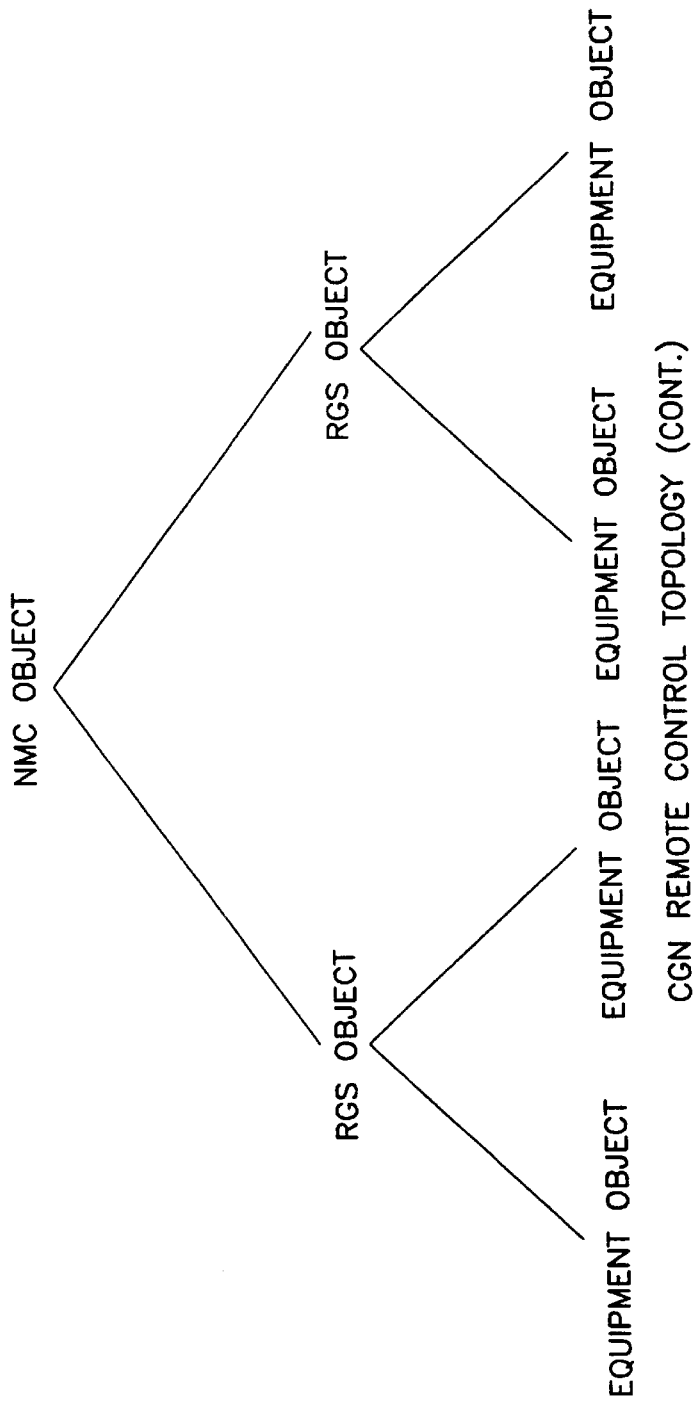

Using object-oriented design, every part of the Commercial Ground Network (CGN) is treated as an object (refer to FIGS. 7a–b). Each CGN object is responsible for control and management of the Network Management Center (NMC) objects. At the next lower level, an NMC object is responsible for control and management of the RGS objects. At the lowest level, an RGS object is responsible for the control and management of all equipment objects (refer to FIG. 6). An equipment object provides the control and management interface to a specific piece of equipment.

Single point access is the ability to access all RGS equipment via a single interface. Control and management of all aspects of an RGS requires the mapping of all ground station equipment to a single entry point. The RGS equipment is physically interfaced to a single computer providing physical single point access (refer to FIGS. 4–6).

The logical interface is implemented using a control and management object called the RGS object. The RGS object maintains an equipment table, where each entry contains a name, an enumerated equipment type identifier, a unit number, an equipment state (i.e., available, allocated, etc.), and a pointer to an equipment object. An equipment object is a control and management object, which provides a command set and handles all specific communication protocol issues necessary for communicating to the physical piece of equipment. It could be considered a logical piece of equipment. One equipment object is created for each piece of equipment defined in the RGS configuration file. The table below depicts a sample RGS configuration file.

| | |
|---|---|
| BitSynch1 | COM2 [9600 n 8 1 1 HS_ON] |
| SignalGenerator1 | COM3 [9600 n 8 1 1 HS_OFF] |
| Receiver1 | COM4 [9600 n 8 1 1 HS_OFF] |
| Antenna1 | COM6 [9600 n 8 1 1 HS_OFF] |

The RGS configuration file is a map that defines the correlation between the physical and the logical equipment. It contains entries in the following form that defines a name, unit number communications port (i.e., RS-232 port, socket, etc.), and communication parameters. The name and unit number define a unique identifier for the piece of equipment.

The RGS object defines several high level functions. These functions are Allocate, Configure, Start, Stop, Transfer Data, Release, Getstatus, and Execute. Each function translates to an equipment object function that performs the equipment specific operation. The Allocate function uses a unique pass identifier to allocate the piece of equipment for a satellite pass. The Configure function uses a satellite identifier to determine the required configuration parameters for the specific equipment operation. The Release function removes the pass identifier from the equipment table and marks the equipment state as available. The Getstatus function returns status for all equipment allocated for a specified pass identifier.

Equipment objects have a single point interface similar to that of the RGS object. All functions in an equipment object have enumerated function identifiers. These identifiers are used by the equipment object function called Execute. This function (Execute) translates the function identifiers into actual equipment specific function calls.

The RGS object's Execute function uses an equipment identifier, unit number, and function identifier to access a specific equipment object function. Using the RGS object's Execute function, graphical user interfaces (GUIs) can be created for each specific equipment type. This GUI interface provides the facility for modifying equipment parameters in real-time. An example of a GUI for one of the equipment in the remote ground station is depicted in FIG. 18b, which in this embodiment is a signal processor. A GUI is provided for each of the equipment at the remotely control remote ground station, which enables the user to configure the ground station for communication with the user's satellite.

Alternatively, the user can enter information regarding his communication requirements into a questionnaire, as depicted in FIG. 20. The graphical user interface then passes this information to the Network Management Center, which determines the appropriate settings based on the information contained in the answers to the questionnaire. FIG. 21 depicts an exemplary list of equipment located in the remote ground station that can be controlled remotely as a result of the present invention.

RGS equipment status is obtained using the RGS object function Getstatus. This function (Getstatus) allows access, restricted by pass identifier, to the equipment status. This interface returns an array of structures specifying equipment status and a composite RGS status.

The equipment scheduling interface is a task scheduler identifier dedicated to the control and management of the RGS equipment. The task scheduler executes a pass schedule received from the NMC. The pass schedule file contains several primitive commands for allocation, configuration, etc. of ground station equipment. These commands translate directly into the RGS object high level functions Allocate, Configure, Start, Stop, Release. Once a schedule file is received, the RGS can execute the scheduled pass without NMC intervention.

The RGS server program creates the task scheduler and RGS objects. The server program provides remote access via a TCP/IP network. The NMC communicates with the server program using messages. A TCP/IP socket is created to handle each unique message type. Each message contains a unique type identifier. This identifier allows the message to be routed to the appropriate part of the server program for processing. The message types map directly to the following objects; the Equipment Scheduling Interface, Remote Equipment Control, and Equipment Status.

The foregoing description shows only the preferred embodiments of the present invention. Various modifications are apparent to those skilled in the art without departing from the scope and spirit of the present invention. Therefore, the embodiments shown should be considered to be illustrative, not in any manner restrictive.

What is claimed is:

1. A shared communication system for communicating between a plurality of independent satellite users and each of their respective orbiting satellites comprising:
   a) a user interface, one for each of the plurality of independent satellite users, accepting user data from one of the plurality of independent satellite users to be transmitted to or accepting user instructions to receive satellite data from a selectable one of the plurality of orbiting satellites;
   b) a central controller being coupled to the user interface, receiving the user data to be transmitted or receiving the user instructions to receive the satellite data from the selectable one of the plurality of orbiting satellites, interacting with the one of the plurality of independent satellite users via the user interface to enable the one of the plurality of independent satellite users to control the satellite to which the user data is to be transmitted and/or satellite data is to be received, and to schedule a time at which the user data is to be transmitted and/or satellite data is to be received; and
   c) a plurality of remote ground stations, each ground station having:
      (i) a remotely transmitter receiving the user data to be transmitted, transmitting the user data to the selectable one of the plurality of orbiting satellites, and
      (ii) a receiver receiving the satellite data for the one of the plurality of independent satellite users from the selectable one of the plurality of satellites, and communicating the satellite data to the user interface or the central controller, wherein the central controller interacts with the one of the plurality of independent satellite users to control from which of the plurality of remote ground stations the user data is to be transmitted and/or satellite data is to be received.

2. The system according to claim 1, further comprising a communications network maintaining communications between said user interface, said central controller, and said plurality of remote ground stations via which the satellite data and the user data is transmitted to and from the plurality of independent satellite users and the plurality of remote ground stations.

3. The system according to claim 1, wherein each of the plurality of remote ground stations includes a control computer and the transmitter at each of the plurality of remote ground stations includes a control input coupled to the control computer by which the control computer configures the transmitter for transmission to one of the plurality of orbiting satellites.

4. The system according to claim 1, wherein each of the plurality of remote ground stations includes a control computer and the receiver at each of the plurality of remote ground stations includes a control input coupled to the control computer by which the control computer configures the receiver for transmission to one of the plurality of orbiting satellites.

5. The system according to claim 3, wherein the user interface includes a graphical user interface via which the user can enter configuration information for the transmitter and receiver at one of the remote ground stations from which user data is to be transmitted to or satellite data is to be received from one of the plurality of orbiting satellites.

6. The system according to claim 5, wherein the configuration information is passed to the control computer at said one of the remote ground stations, and the control computer configures the transmitter or receiver according to the configuration information.

7. The system according to claim 1, wherein the user interface comprises a graphical user interface executing on a computer, and includes a web browser enabling a user to enter user identification information.

8. The system according to claim 7, wherein the graphical user interface includes a web page enabling a user to specify a satellite access time and a particular remotely controlled ground station from which the user desires to communicate with the satellite in orbit.

9. The system according to claim 7, wherein the graphical user interface includes a web page enabling a user to specify communication format and protocol information for communicating with the satellite in orbit, which communication format and protocol information is used to configure communication equipment at one of the remotely controlled ground stations.

10. The system according to claim 7, wherein the graphical user interface includes a web page enabling a user to enter user data to communicate to the satellite in orbit or to specify satellite data to retrieve from the satellite in orbit.

11. The system according to claim 7, wherein the graphical user interface includes a web page enabling a user to view the satellite's current orbital path.

12. The system according to claim 7, wherein the graphical user interface includes a web page enabling a user to participate in a data communication session with the satellite in orbit in real-time or to specify a store and forward operation of data retrieved from the satellite.

13. The system according to claim 7, wherein the graphical user interface includes a web page enabling a user to configure equipment in a communications path within one of the remote ground stations for use in communicating with one of the plurality of orbiting satellites.

14. The system according to claim 2, wherein said communications network comprises a public switched telephone network, which is used for low priority and small sized transmissions, and a frame relay transmission network, which is used for large packets of data being transmitted in real time.

15. A method for communicating data between a user and a satellite via a plurality of remote ground stations comprising the steps of
   acquiring identification data from the user, which identification data includes an identification of the satellite with which the user wishes to communicate, and control data to be transmitted to the satellite, if any;
   presenting to the user a list of available time slots and associated remote ground stations for communicating with the identified satellite based on the identification data; and
   enabling a user to select an available time slot and an appropriate ground station.

16. The method according to claim 15, further comprising the steps of transferring the identification and control data to a central controller and resolving resource allocation and communication conflicts among other users and available resources to facilitate transmission of the control data to the identified satellite.

17. The method according to claim 15, further comprising the step of transferring the control data to the remote ground station and transferring the control data to the identified satellite.

18. The method according to claim 15, further comprising the step of receiving satellite data from the identified satellite and transferring the satellite data to the user.

19. The method according to claim 15, further comprising the step of requesting priority data and pricing preference information from the user and allocating resources and communication conflicts based on said priority data and pricing preference information.

20. A single command and control center for a plurality of independently launched and operated satellites, said single command and control center interacting with a plurality of users at a plurality of user sites, comprising:
   a) a network management center providing command and control services for all of the plurality of independently launched and operated satellites, receiving user data to be transmitted to the plurality of independently launched and operated satellites and managing requests from the plurality of users for satellite data from the plurality of independently launched and operated satellites;
   b) a user interface being disposed at each of the plurality of user sites, enabling a user to interact with the network management center to send user data to a satellite the user desires to communicate with, and to receive satellite data from a satellite the user desires to communicate with; and
   c) a plurality of remote ground stations being controlled by the network management center, and transmitting user data to and receiving satellite data from each of the plurality of independently launched and operated satellites.

21. The single command and control center according to claim 20, further comprising a data network coupling the network management center, the plurality of remote ground stations and the plurality of user sites together in a wide area network.

22. The single command and control center according to claim 20, wherein the user data includes commands.

23. The single command and control center according to claim 21, wherein the commands include one selected from the group consisting of instructions to cameras on a satellite to acquire data from designated locations on earth, instructions to collect radio signals at designated frequencies, or instructions to transmit back to earth designated data that has been previously collected by a satellite.

24. The single command and control center according to claim 20, wherein the network management center includes a database storing orbital data for all of the plurality of independently launched and operated satellites.

25. The single command and control center according to claim 24, wherein the network management center determines which one of the plurality of remote ground stations is optimum to transmit particular user data to a particular satellite at a particular time based on the orbital data stored in the database.

26. The single command and control center according to claim 24, wherein the network management center determines which one of the plurality of remote ground stations is optimum to transmit particular user data to a particular satellite at a particular time based on the orbital data stored in the database and provides this determination to the user via the user interface, and the user interface enables the user to select which of the remote ground stations from which to communicate.

27. The single command and control center according to claim 24, wherein the network management center determines which one of the plurality of remote ground stations is optimum to receive particular user data from a particular satellite at a particular time based on the orbital data stored in the database.

28. The single command and control center according to claim 20, wherein the network management center transmits configuration information to a particular one of the plurality of remote ground stations selected to transmit the user data or receive the satellite data, and the configuration information includes information required to handle transmission of the user data or reception of the satellite data.

29. The single command and control center according to claim 24, wherein the network management center schedules all user requests and optimizes when and from what remote ground station each set of commands should be transmitted.

30. The single command and control center according to claim 27, wherein the network management center determines which one of the remote ground stations is optimum to receive the particular user data based on a time when the particular user data will be ready and a period of time required to retrieve the particular user data.

31. The single command and control center according to claim 20, wherein the network management center further comprises an auto-scheduler, which stores schedule information and transmits instructions to a particular remote ground station to begin preparing to communicate with a particular satellite.

32. The single command and control center according to claim 20, wherein each of the remote ground stations further comprises a processor including a pre-pass configuration build module, a construct antenna commands and frequency predicts module, and a storage including a customer configuration file, and an orbital elements file.

33. The single command and control center according to claim 32, wherein the customer configuration file includes information required to configure the remote ground station for a particular communication with a particular satellite, which information is passed to the pre-pass configuration build module.

34. The single command and control center according to claim 33, wherein the pre-pass configuration build module sends required commands to the construct antenna commands and frequency predicts module, which in combination with information from the orbital elements file initializes and configures the antenna and radio frequencies to communicate with the particular satellite.

35. The single command and control center according to claim 32, wherein the processor further comprises a pre-pass calibration test module performing a series of system checks prior to a scheduled time for the particular satellite to appear within communication range.

36. The single command and control center according to claim 31, wherein the auto-scheduler transmits a prompt to a particular user over the data transport network approximately at the same time the auto-scheduler transmits instructions to a particular remote ground station to begin preparing to communicate with the particular satellite.

37. The single command and control center according to claim 36, wherein the user interface further comprises a customer log-on interface via which the particular user logs-on to the user interface and a customer access authentification interface authenticating the particular user during a log-on attempt, and upon authentification, data received at the particular remote ground station is transmitted to the particular user via the data transport network.

38. An apparatus for enabling a user to interact with a network of remotely controlled ground stations communicating with a satellite in orbit, comprising:
 a) a computer having an interface to a network to which the remotely controlled ground station is coupled; and
 b) a graphical user interface executing on the computer, and including:
  (i) a web browser enabling a user to enter user identification information;
  (ii) a first web page enabling a user to specify a satellite access time and a particular remotely controlled ground station from which the user desires to communicate with the satellite in orbit; and
  (ii) a second web page enabling a user to specify communication format and protocol information for communicating with the satellite in orbit, which communication format and protocol information is used to configure communication equipment at one of the remotely controlled ground stations.

39. The apparatus according to claim 38, wherein the graphical user interface further comprises a third web page enabling a user to enter user data to communicate to the satellite in orbit or to specify satellite data to retrieve from the satellite in orbit.

40. The apparatus according to claim 38, wherein the graphical user interface further comprises a third web page enabling a user to view the satellite's current orbital path.

41. The apparatus according to claim 38, wherein the graphical user interface further comprises a third web page enabling a user to participate in a data communication session with the satellite in orbit in real-time or to specify a store and forward operation of data retrieved from the satellite.

* * * * *